(12) United States Patent
Chambers et al.

(10) Patent No.: US 9,213,116 B2
(45) Date of Patent: Dec. 15, 2015

(54) SYSTEM AND METHOD FOR MOMENT TENSOR MIGRATION IMAGING

(75) Inventors: Christopher Chambers, Newquay (GB); Stephen Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/130,661

(22) PCT Filed: Jul. 10, 2012

(86) PCT No.: PCT/US2012/046058
§ 371 (c)(1),
(2), (4) Date: Jan. 2, 2014

(87) PCT Pub. No.: WO2013/012610
PCT Pub. Date: Jan. 24, 2013

(65) Prior Publication Data
US 2014/0226437 A1    Aug. 14, 2014

Related U.S. Application Data

(60) Provisional application No. 61/572,695, filed on Jul. 19, 2011.

(51) Int. Cl.
*G01V 1/30* (2006.01)
*G01V 1/36* (2006.01)

(52) U.S. Cl.
CPC .. *G01V 1/30* (2013.01); *G01V 1/36* (2013.01); *G01V 2210/21* (2013.01)

(58) Field of Classification Search
CPC ............. G01V 1/28; G01V 9/00; G01V 1/40; G01V 2210/123
See application file for complete search history.

(56) References Cited

U.S. PATENT DOCUMENTS 4,516,206 A     5/1985   McEvilly
5,377,104 A    12/1994   Sorrells et al.
(Continued)

FOREIGN PATENT DOCUMENTS

WO      2008033797 A2    3/2008
WO      2010080366 A1    7/2010
(Continued)

OTHER PUBLICATIONS

Search Report and Written Opinion issued Jan. 30, 2013 for International Application PCT/US12/46058, 9 pages.
(Continued)

*Primary Examiner* — Luke Ratcliffe
(74) *Attorney, Agent, or Firm* — Schwegman Lundberg & Woessner, P.A.; John W. Wustenberg

(57) ABSTRACT

A method for estimating moment tensor components of a source can use a waveform based method that performs a stack function on projected data from each sensor. The method can produce a cumulative result for each moment tensor component, for each propagation phase at each image point and origin time. A system for use in imaging a subterranean region of interest can include instructions which operate on recorded actual seismic data output from seismic receivers having known positions, and at least one processor, whereby the instructions cause the processor to project a selected data sample from the seismic data onto a moment tensor component.

49 Claims, 18 Drawing Sheets

(56) References Cited

U.S. PATENT DOCUMENTS

| | | | |
|---|---|---|---|
| 5,963,508 | A | 10/1999 | Withers |
| 7,127,353 | B2 | 10/2006 | Geiser |
| 7,647,183 | B2 | 1/2010 | Jechumtalova et al. |
| 7,978,563 | B2 | 7/2011 | Thornton et al. |
| 8,612,155 | B2 | 12/2013 | Khadhraoui et al. |
| 2005/0190649 | A1* | 9/2005 | Eisner et al. ............... 367/38 |
| 2006/0081414 | A1 | 4/2006 | Matherne et al. |
| 2008/0004847 | A1 | 1/2008 | Bradford |
| 2008/0259727 | A1 | 10/2008 | Drew |
| 2009/0010104 | A1* | 1/2009 | Leaney ...................... 367/47 |
| 2009/0048783 | A1* | 2/2009 | Jechumtalova et al. ....... 702/11 |
| 2009/0248312 | A1 | 10/2009 | Hsu et al. |
| 2009/0259406 | A1 | 10/2009 | Khadhraoui et al. |
| 2009/0299637 | A1 | 12/2009 | Dasgupta |
| 2010/0157730 | A1 | 6/2010 | Bradford |
| 2010/0161234 | A1 | 6/2010 | Saenger et al. |
| 2010/0161235 | A1 | 6/2010 | Ikelle |
| 2010/0238765 | A1 | 9/2010 | Grechka et al. |
| 2010/0256964 | A1 | 10/2010 | Lee et al. |
| 2011/0042098 | A1 | 2/2011 | Imhof |
| 2011/0286306 | A1* | 11/2011 | Eisner et al. ............... 367/47 |
| 2011/0292763 | A1* | 12/2011 | Coates et al. ............... 367/25 |

FOREIGN PATENT DOCUMENTS

| | | |
|---|---|---|
| WO | 2010085493 A1 | 7/2010 |
| WO | 2011084436 A1 | 7/2011 |

OTHER PUBLICATIONS

McMechan, George A. "Determination of Source Parameters by Wavefield Extrapolation", article, Mar. 30, 1982, pp. 613-628, vol. 71, No. 3, Geophysical Journal International.

McMechan et al. "Imaging of Earthquake Sources in Long Valley Caldera, California, 1983", paper, Aug. 1985, pp. 1005-1020, vol. 75, No. 4, Bulletin of the Seismological Society of America.

Dyer et al. "Microseismic Survey of a North Sea Reservoir", article, Mar. 1999, pp. 74-78, Gulf Publishing Company.

Baker et al. "Real-time Earthquake Location Using Kirchoff Reconstruction", article, Apr. 2005, pp. 699-707, vol. 95, No. 2, Bulletin of the Seismological Society of America.

Gajewski et al. "Reverse Modelling for Seismic Event Characterization", article, Jun. 29, 2005, pp. 276-284, vol. 163, No. 1, Geophysical Journal International.

Norton et al. "Passive Imaging of Underground Acoustic Sources", article, May 2006, pp. 2840-2847, vol. 199, No. 5, Journal of the Acoustical Society of America.

Kochnev et al. "Imaging Hydraulic Fracture Zones from Surface Passive Microseismic Data", article, Oct. 2007, pp. 77-80, vol. 25, No. 10, First Break.

Rentsch et al. "Fast Location of Seismicity: A Migration-Type Approach with Application to Hydraulic-Fracturing Data", article, Jan.-Feb. 2007, pp. S33-S40, vol. 72, No. 1, Geophysical Journal International.

Leaney, "Inversion of Microseismic Data by Least-Squares Time Reversal and Waveform Fitting", conference paper, Nov. 2008, 2008 SEG Annual Meeting, Society of Exploration Geophysicists.

Xuan, "Probablistic micro-earthquake location for reservoir monitoring", Master's thesis, Sep. 2009, pp. iii-96, Center for Wave Phenomena, Colorado School of Mines.

Xuan, Ran and Sava, Paul, "Probablistic microearthquake location for reservoir monitoring", article, May-Jun. 2010, pp. MA9-MA26, vol. 75, No. 3, Geophysical Journal International.

Chambers et al., "Testing the ability of surface arrays to monitor microseismic activity", article, Jun. 2009, pp. 821-830, vol. 58, No. 5, Geophysical Prospecting.

Chambers et al., "Investigation of induced microseismicity at Valhall using the Life of Field Seismic array", article, Mar. 2010, pp. 290-295, vol. 29, No. 3, The Leading Edge.

Eisner et al. "Comparison of surface and borehole locations of induced seismicity", article, Jun. 2009, pp. 1-12, vol. 58, No. 5, Geophysical Prospecting.

Rodriguez et al. "Continuous hypocenter and source mechanism inversion via a Green's function-based matching pursuit algorithm", article, Mar. 2010, pp. 334-337, vol. 29, No. 3, The leading Edge.

Nath Gharti et al., "Simultaneous microearthquake location and moment-tensor estimation using time-reversal imaging", conference paper, Sep. 2011, 2011 SEG Annual Meeting, Society of Exploration Geophysicists.

Kawakatsu at al. "Time-reversal seismic-source imaging and moment-tensor inversion", article, Apr. 2008, pp. 686-688, vol. 175 No. 2, Geophysical Journal International.

International Search Report and Written Opinion issued Jan. 30, 2013 for PCT Patent Application No. PCT/US2012/046058, 9 pages.

Aki, Keiiti and Richards, Paul G., "Quantitative Seismology: Theory and Methods", book, 1980, vol. 2, W.H. Freeman and Company.

Shearer, Peter M., "Introduction to Seismology", book, 2009, Second Edition, Cambridge University Press, New York.

\* cited by examiner

TIME=100ms

TIME=50ms

TIME=0ms

SYSTEM AND METHOD FOR MOMENT TENSOR MIGRATION IMAGING

CROSS-REFERENCE TO RELATED APPLICATIONS

This application is a national stage under 35 USC 371 of International Application No. PCT/US12/46058, filed on 10 Jul. 2012, which claims priority to a Provisional Application No. 61/572,695, filed on 19 Jul. 2011. The entire disclosures of these prior applications are incorporated herein by this reference.

TECHNICAL FIELD

The present disclosure relates generally to seismic exploration, fracture detection and production monitoring, and in one example described below, more particularly relates to a system and method for analyzing distribution and properties of microseismic events.

BACKGROUND

Seismology typically uses recordings of vibration to infer information about a source that created the vibration, and/or to infer information about properties of the earth. Generally, the vibration is modeled as a propagating wavefield between the source and a receiver.

DETAILED DESCRIPTION

Figure 1:
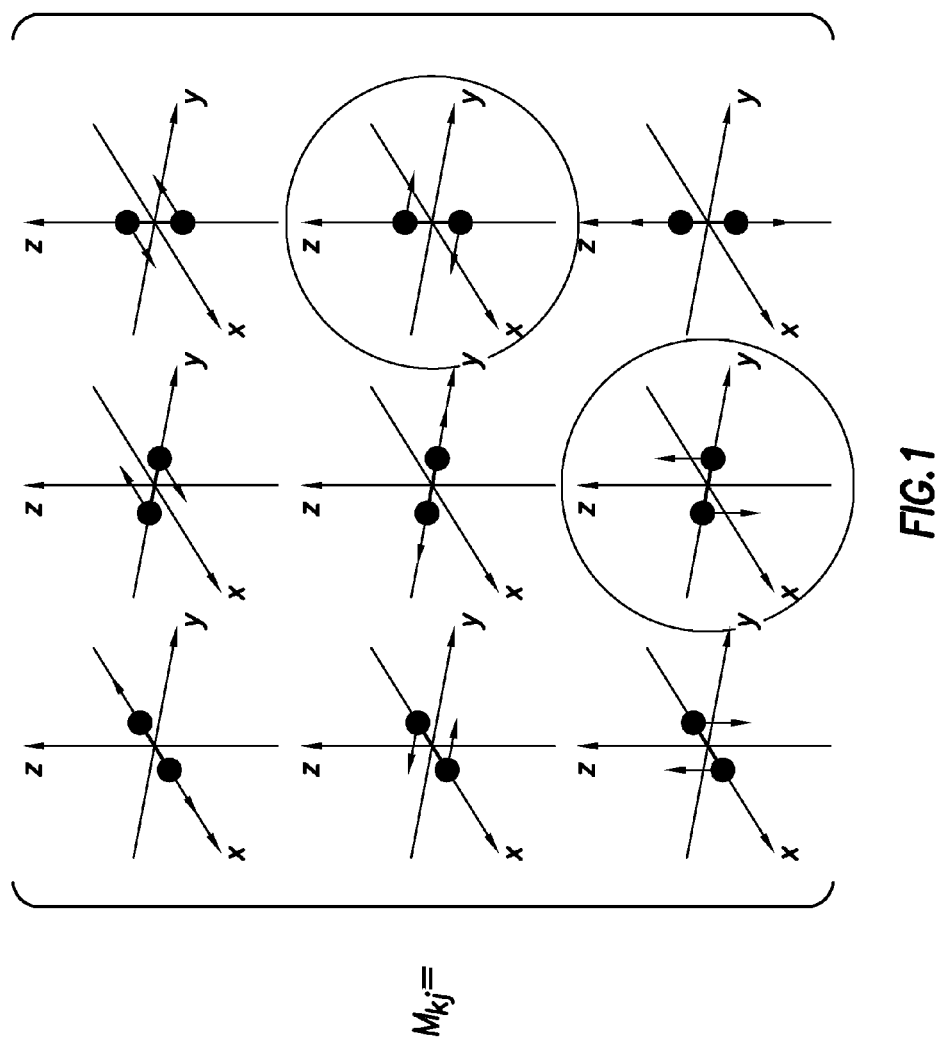
FIG. 1 is a diagram representatively illustrating a geometry of force couples for a seismic moment tensor, in which an example pairing of equal elements is depicted by shading.

Representatively illustrated in the drawings are a system and associated method which can embody principles of this disclosure. However, it should be clearly understood that the illustrated system and method are merely examples of application of the principles of this disclosure in practice, and a wide variety of other examples are possible. Therefore, the scope of this disclosure is not limited at all to the details of the system and method described herein and/or depicted in the drawings.

A relationship between a source, a propagating wavefield and an observed wavefield at a receiver can be summarized using a convolution of a Green's function with a point force, as follows:

$$d_i(r, t) = \sum_{j=1}^{j=3} G_{ij}(r, s, t - \tau) * f_j(s, \tau) \tag{1}$$

where $f_j(s,\tau)$ represents a component of the force acting at the source position s, and time $\tau$. $\tau$ is also referred to as the origin time of the source, and s is also referred to as the hypocenter. The components i and j refer to spatial axis, hence $d_i(r,t)$ refers to the recorded seismogram with motion in direction i positioned at the receiver location r. Note that the function $f_j(s,\tau)$ varies in both time and space, indicating that the source can be anywhere and at any time.

The signal (wavefield) from the source propagating to the receiver is modeled by a time domain convolution, *, of the point force with the Greens function, $G_{ij}(r,s,t)$. In other words, the Green's function represents the transfer of the point force signal into the recorded seismogram, $d_i(r,t)$. The seismogram can be considered a sum of point forces acting at different positions and origin times, as follows:

$$d_i(r, t) = \int \sum_{j=1}^{j=3} G_{ij}(r, s, t - \tau) * f_j(s, \tau) ds \tag{2}$$

where the integral is performed over some volume containing the potential sources.

Equations 1 and 2 are of limited use in seismology, as earthquakes are not described well by point forces. This is because equations 1 and 2 do not provide for motion caused by slip along a fault.

Instead, seismologists typically characterize sources using a moment tensor, M. The moment tensor is a 3×3 matrix with each element representing a force couple about a point. The moment tensor is defined as:

$$M_{ij} = \begin{pmatrix} m_{11} & m_{12} & m_{13} \\ m_{21} & m_{22} & m_{23} \\ m_{31} & m_{32} & m_{33} \end{pmatrix} \quad (3)$$

where each element represents a force couple about a point, as depicted in FIG. 1. Although the moment tensor contains nine force couples, the tensor is symmetric, and so there are only six independent elements. Hence, $M_{ij}=M_{ji}$.

The moment tensor is incorporated into the model for the seismic source by using a spatial derivative of the Greens function:

$$G_{ij,k}(r, s, t) = \frac{\partial G_{ij}(r, s, t)}{\partial x_k} \quad (4)$$

where the derivative operator is applied at the source, s. Equation 1 then becomes:

$$d_i(r, t) = \sum_{k=1}^{k=3} \sum_{j=1}^{j=3} G_{ij,k}(r, s, t-\tau) * m_{jk}(s, \tau) \quad (5)$$

and Equation 2 becomes:

$$d_i(r, t) = \int \sum_{k=1}^{k=3} \sum_{j=1}^{j=3} G_{ij,k}(r, s, t-\tau) * m_{jk}(s, \tau) ds \quad (6)$$

Equation 6 can be re-written using an un-wrapped moment tensor m, consisting of the six independent components of the seismic moment tensor, as follows:

$$m=(m_{11}, m_{12}, m_{22}, m_{13}, m_{23}, m_{33}) \quad (7)$$

Thus, Equation 5 becomes:

$$d_i(r, t) = \int \sum_{j=1}^{j=6} \hat{G}_{ij}(r, s, t-\tau) * m_j(s, \tau) ds \quad (8)$$

where $\hat{G}_{ij}(r, s, t-\tau)$ represents the corresponding element of the un-wrapped Green's function. The expression of Equation 8 is simplified by transforming the data into the frequency domain, thus the time-domain convolution becomes a multiplication:

$$d_i(r, \omega) = \int \sum_{j=1}^{j=6} \hat{G}_{ij}(r, s, \omega) m_j(s, \omega) ds \quad (9)$$

It is also useful to discretize Equation 9 and express it in matrix form, as follows:

$$d=\hat{G}m \quad (10)$$

where d is a vector containing the Fourier coefficients of all the observed seismograms on all components placed end to end, the elements of $\hat{G}$ correspond to the Green's functions for each point in the region of interest, and the vector m contains the six independent moment tensor elements for each potential source location and frequency.

Forward Modeling of the Seismic Wavefield

Ray Theory

So far, it has been described how the observed seismic wavefield can be modeled using a combination of Green's functions. However, the foregoing has not described how the Green's functions themselves might be computed. Those of ordinary skill in the art will appreciate that an approach is to use ray tracing to model the wave propagation between the source and the receiver.

Typically, seismic data is described using elastic wave propagation which, for convenience, is often divided into different types or modes of propagation. For example, surface waves are isolated to regions near large changes in material properties, such as at the surface of the earth, hence the name. However, for purposes of this disclosure, discussion can be limited to the modes of propagation that travel through the medium of interest, which are known as body waves.

Figure 2:
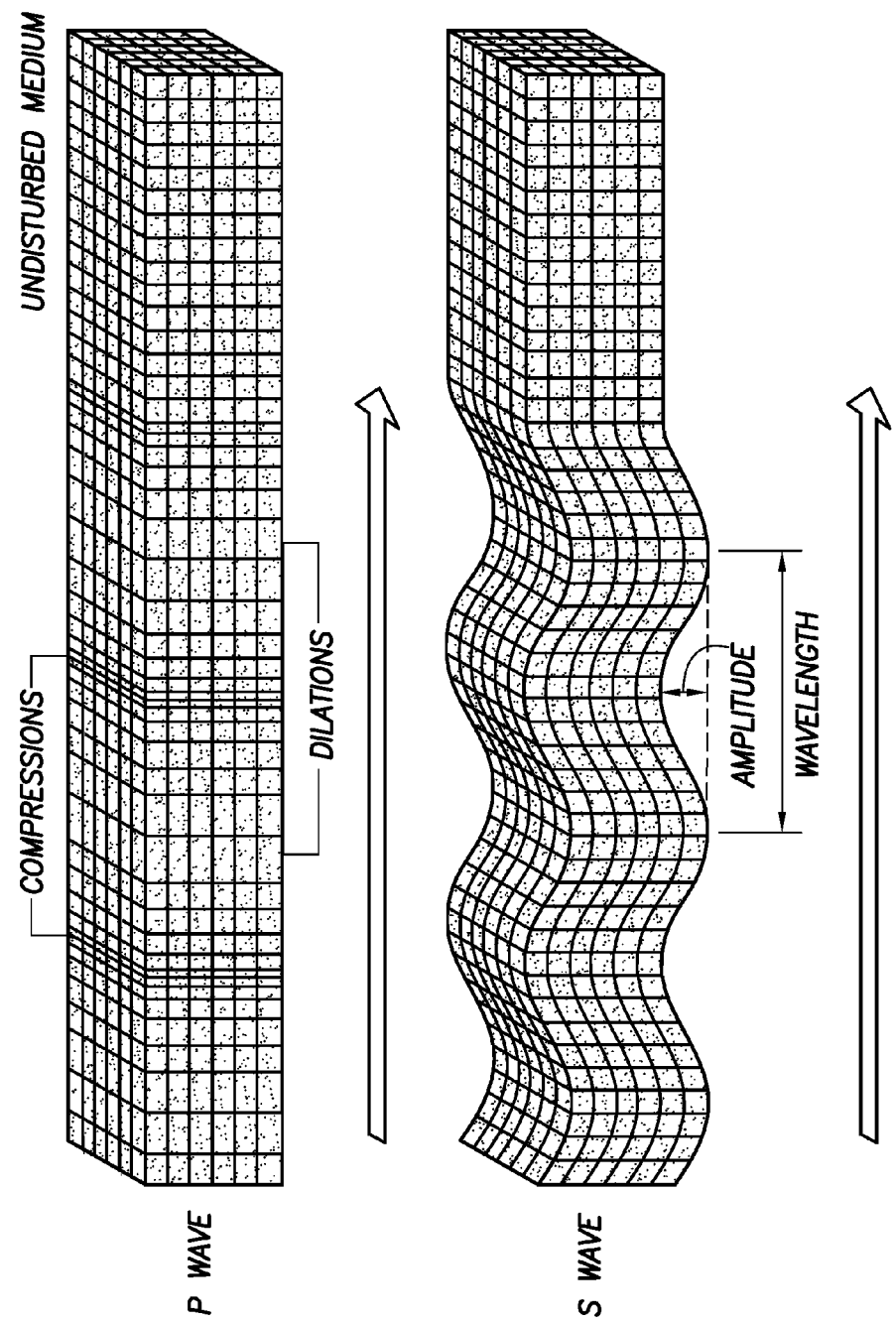
FIG. 2 is a diagram representatively illustrating particle motion for P and S-wave propagation.

FIG. 2 shows the two types of body wave phases, P and S. P-waves (also referred to as primary waves) travel faster and hence arrive first. They consist of particle motion parallel to a direction of wave propagation. S-waves consist of particle motion in a direction perpendicular to the direction of wave propagation.

The body wave parts of the seismogram may be modeled as a sum of P and S-wave arrivals, as follows:

$$d_i = \sum_{m=P1,S1 \ldots PN,SN} u_i^m \quad (11)$$

Figure 3:
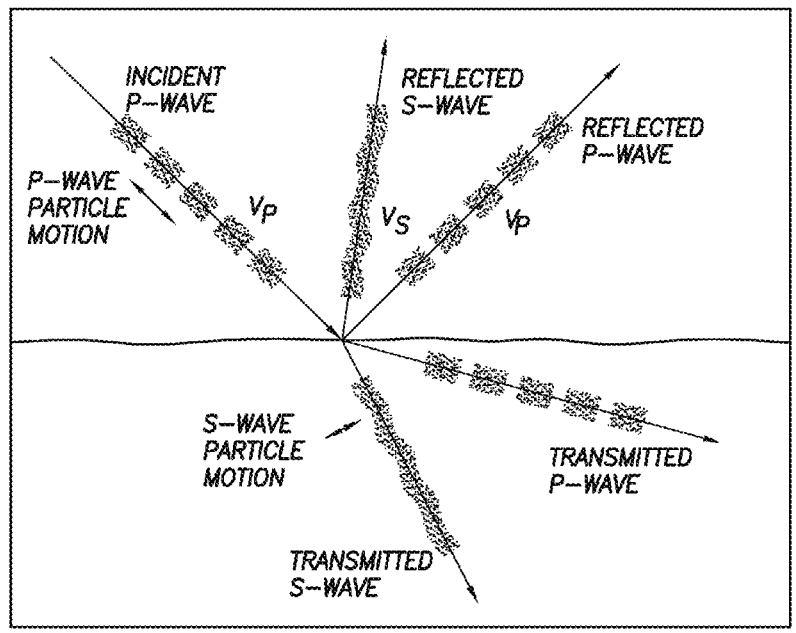
FIG. 3 representatively illustrates an interaction of a wavefield with discrete changes inelastic properties, creating reflected and converted waves.

The summation in Equation 11 refers to all possible different P and S-wave arrivals at a receiver. In a homogenous isotropic medium, there will be only one P-wave arrival and one S-wave arrival. However, the presence of seismic velocity variations (heterogeneity) in the medium will create reflections and conversions (e.g., as depicted in FIG. 3), as well as triplications in a wavefront, resulting in multiple arrivals at the receiver (e.g., as depicted in FIG. 4).

Figure 4:
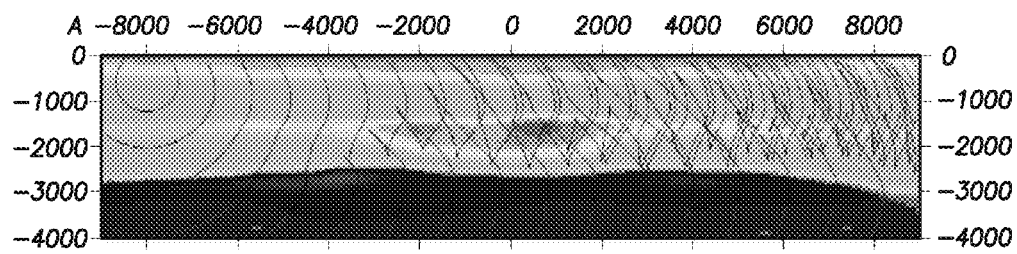
FIG. 4 is a representative diagram depicting P-wave and S-wave particle motion at an interface.

FIG. 4 shows that the presence of strong variations in elastic properties can cause the wavefront to fold back on itself, creating triplications. This figure is derived from Chambers, et al. (2008).

In FIG. 4, each black line shows the position of the wavefront at a given time. A varying background depicts a varying seismic velocity. As the wavefront progresses, it forms a swallow tail pattern which results in at least three arrivals at receivers on the right, whereas there will only be one arrival at receivers on the left.

The triplication begins at around X=−4000, where the wavefield is refracted upward from the high velocities at the base of the model and it begins to overlap a down-going wavefield in the overlying medium. Hence, a sensor placed at the top of the model at X=−1000 will observe three arrivals corresponding to triplicated parts of the wavefront. Toward the right of the model, many more arrivals will be seen as the wavefront is repeatedly triplicated.

Far-field ray based synthetics for the P-wave and S-wave in a homogenous medium can be expressed as follows:

$$d_i = u_i^P + u_i^S \tag{12}$$

where $$u_i^P = \sum_{j=1}^{j=3}\sum_{k=1}^{k=3} \frac{1}{4\pi\rho v_P^3}\frac{1}{r}\gamma_i\gamma_j\gamma_k m_{jk}\delta(t-r/v_P) \tag{13}$$

and $$u_i^S = \sum_{j=1}^{j=3}\sum_{k=1}^{k=3} \frac{1}{4\pi\rho v_S^3}\frac{1}{r}(\delta_{ij}-\gamma_i\gamma_j)\gamma_k m_{jk}\delta(t-r/v_S) \tag{14}$$

In the above, $\rho$ is the density of the medium, and $v_P$ and $v_S$ are the respective velocities for P-waves and S-waves in the medium. r is a distance between the source and the receiver, hence the term 1/r is a decay in amplitude due to spreading out i of the wavefront as it moves away from the source (also called geometrical spreading). $\gamma_i$ is the $i^{th}$ direction cosine describing the direction of the rays leaving the source position. The quantity $\delta_{ij}$ is given by:

$$\delta_{ij} = \begin{cases} 1 & i=j \\ 0 & i \neq j \end{cases} \tag{15}$$

Finally, the function $\delta(\ )$ is the dirac delta function:

$$\delta(x) = \begin{cases} 1 & x=0 \\ 0 & x \neq 0 \end{cases} \tag{16}$$

Figure 5A:
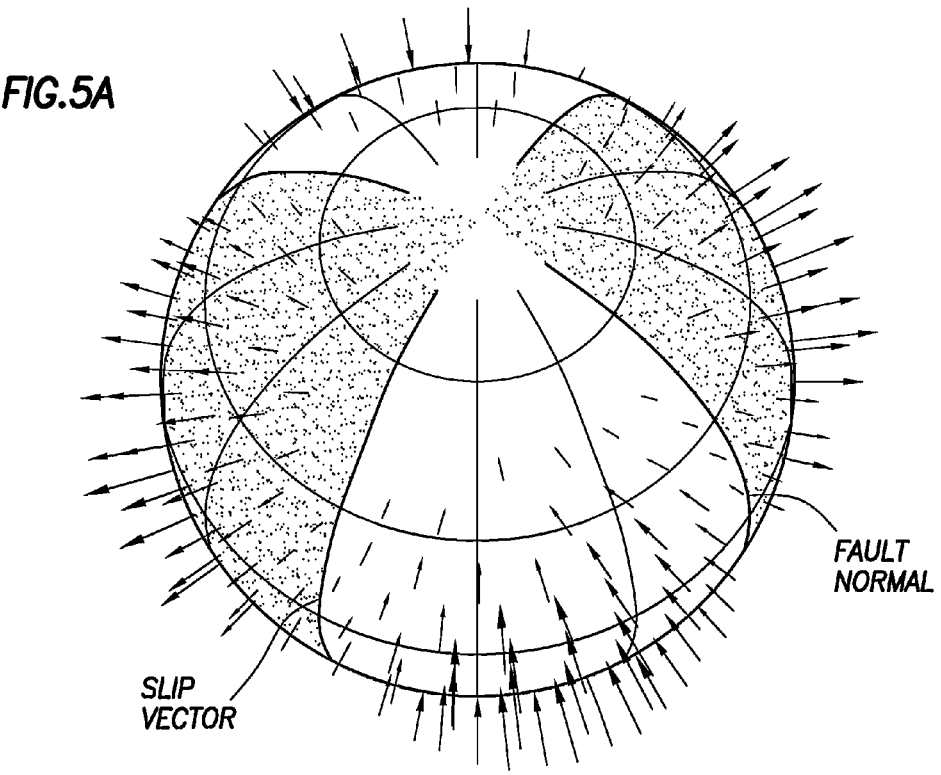
FIGS. 5A & B representatively illustrate polarization of P-waves (FIG. 5A) and S-waves (FIG. 5B) emanating from a moment tensor source.
Figure 5B:
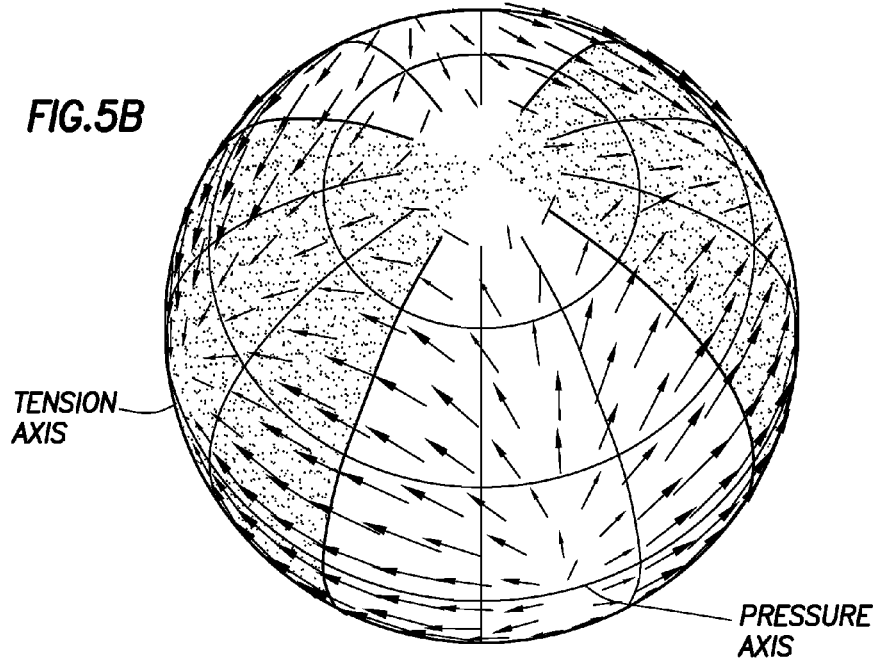

The moment tensor of a seismic source has a dramatic effect upon the observed waveforms. FIGS. 5A & B depict polarization directions and magnitudes for waves emanating from a moment tensor source as per Equations 13 and 14 above. FIGS. 5A & B are derived from Shearer, Introduction to Seismology (Columbia University Press, 1999).

As can be seen from the figures, the polarization of the observed wave depends on the wave type and the direction of take-off for the ray leaving the source.

Equations 13 and 14 can be generalized to heterogenous media as follows:

$$u_q^P(r,t;s,\tau) = A^P(r,s)\frac{H^K\{\delta(r-T^P(r,s)-\tau)\}}{4\pi\rho(s)v_P^3(s)}\left(\frac{v_P(s)\tau(s)}{v_P(r)\rho(r)}\right)^{\frac{1}{2}} \tag{17}$$

$$\left(\frac{\partial\Omega}{\partial S}\right)^{\frac{1}{2}} \times \sum_{i=1}^{i=3}\Gamma_{qi}^P(r,s)\sum_{j=1}^{j=3}\sum_{k=1}^{k=3}\gamma_i(r,s)\gamma_j(r,s)\gamma_k(r,s)m_{jk}(s,\tau)$$

$$u_q^S(r,t;s,\tau) = A^S(r,s)\frac{H^K\{\delta(t-T^S(r,s)-\tau)\}}{4\pi\rho(s)v_S^3(s)}\left(\frac{v_S(s)\rho(s)}{v_S(r)\rho(r)}\right)^{\frac{1}{2}}\left(\frac{\partial\Omega}{\partial S}\right)^{\frac{1}{2}} \times \tag{18}$$

$$\sum_{i=1}^{i=3}\Gamma_{qi}^S(r,s)\sum_{j=1}^{j=3}\sum_{k=1}^{k=3}(\delta_{ij}-\gamma_i(r,s)\gamma_j(r,s))\gamma_k(r,s)m_{jk}(s,\tau)$$

Where $A^P(r,s)$ and $A^S(r,s)$ represent ray amplitudes for the ray traveling between the source and receiver, they can include amplitude loss due to reflection, transmission and conversion at interfaces, anisotropic polarity changes, as well as phase shifts due to triplications in the wavefield. The function, $H^K\{\ \}$ is used to denote a Hilbert transform, where the order of the transform, K, is the KMAH index of the ray raypath for r,s. $T^P(r,s)$ and $T^S(r,s)$ are the corresponding travel times for the ray.

Note the parameters $\rho(s)$, $v_S^3(s)$, $v_P^3(s)$ are now evaluated at the source or receiver positions. The term $\partial\Omega/\partial S$ represents a ratio of the area of solid angle at the source to an area of wavefront at the receiver for an infinitesimal tube of rays connecting the source and receiver (the geometrical spreading term). $\Gamma_{qi}^P$ and $\Gamma_{qi}^S$ are the matrices projecting the vector of motion at the source onto the components at the receiver. For P-waves:

$$\Gamma_{ij}^P(r,s) = \eta_i^P(r,s)\gamma_j^P(r,s) \tag{19}$$

and for S-waves:

$$\Gamma_{ij}^S(r,s) = \eta_i^{(1)}(r,s)\gamma_j^{(1)}(r,s)+\eta_i^{(2)}(r,s)\gamma_j^{(2)}(r,s) \tag{20}$$

where $\eta_i^P$ is the component of the vector describing the ray arrival's direction at the receiver. $\eta_i^{(1)}$ and $\eta_i^{(2)}$ form an orthoganol set along with the ray direction vector $\eta_i^{P/S}$. Similarly $\gamma_j^{(1)}$ and $\gamma_j^{(2)}$ form an orthoganol set with the ray direction vector leaving the source.

In practice, in Equations 17 and 18 there should also be a summation over all possible ray paths connecting r and s. Furthermore, there is no allowance for frequency dependent propagation effects, such as attenuation. Corrections to the $\Gamma$ matrices may also be required if the receiver or source is located at a free surface. Finally, for anisotropic media there will be two S-wave equations corresponding to fast and slow shear waves.

Numerical Methods

Figure 6A:
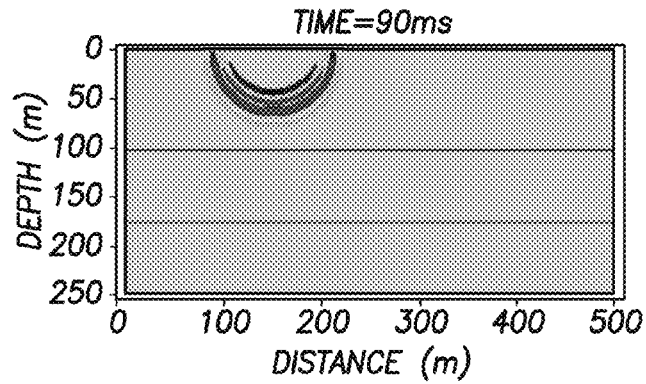
FIGS. 6A-C are representative snapshots of a numerical simulation of seismic wave propagation in a three-layered medium.
Figure 6B:
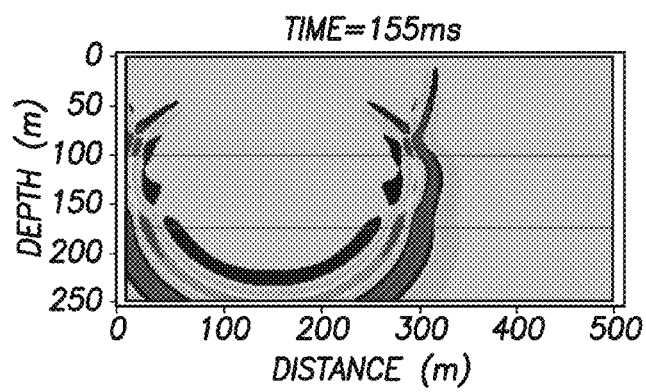
Figure 6C:
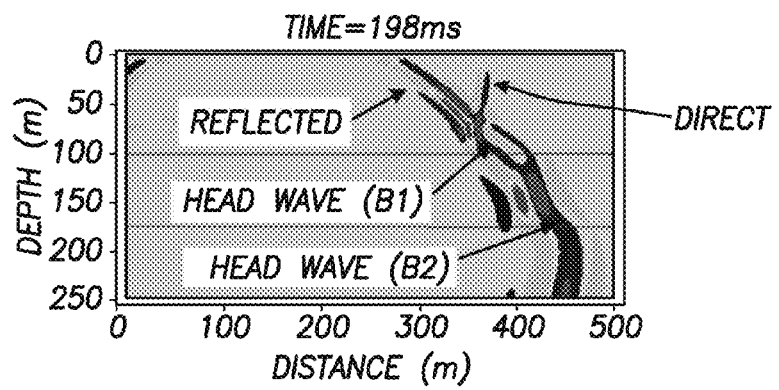

Formally, ray tracing is also a numerical method, as it is generally implemented on a computer. However, for the purposes of this disclosure, it is convenient to describe numerical methods for modeling wave propagation as those which simulate the wavefield directly and do not trace rays. Common examples of numerical methods for modeling seismic wave propagation include finite difference and finite element solutions to the wave equation. FIGS. 6A-C together show an example simulation of seismic wave propagation.

These methods are advantageous in that they generally allow for a more realistic simulation of the seismic wavefield, including aspects for wave propagation that are ignored or not modeled well by ray theory, such as frequency dependent phenomena and interactions with complicated structures.

Microseismic Monitoring

The analysis of the distribution and properties of microseismic events has proved a useful tool in unconventional resource development, global seismology, glaciology and volcanology. However, population statistics for microseismic events are biased toward the presence of many smaller events, and fewer large events. Thus, it is important to be able to extract information within the population of events with low signal amplitudes.

Monitoring Scenarios

Figure 7A:
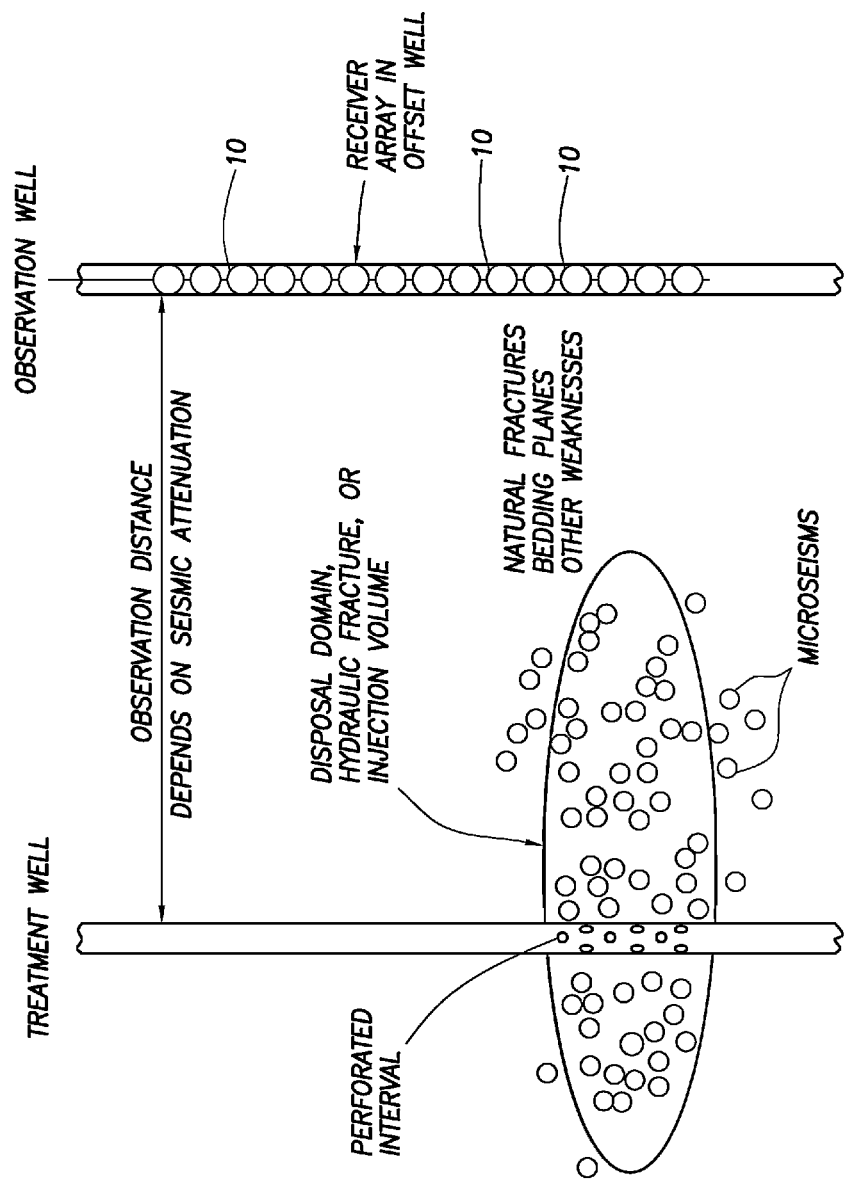
FIGS. 7A & B representatively illustrate example geometries for microseismic monitoring.

The small magnitude of production related events normally makes the use of borehole sensors preferable (see FIG. 7A). A typical downhole monitoring scenario may consist of: sensors 10 (perhaps up to 20 or more) deployed in a borehole (e.g., an observation well, see FIG. 7A), typically less than 500 m from a region of activity (e.g., a treatment well), with each sensor measuring three components of motion. Waveform attribute methods are typically used to locate events.

One reason for the use of downhole sensors 10 (sensors in a borehole) is to provide data with signal to noise ratios high enough to allow observation of arrivals from events in individual records. These arrivals are characterized using waveform attributes, such as travel time and waveform polarization, which are then used to locate the event (see next section).

Figure 7B:
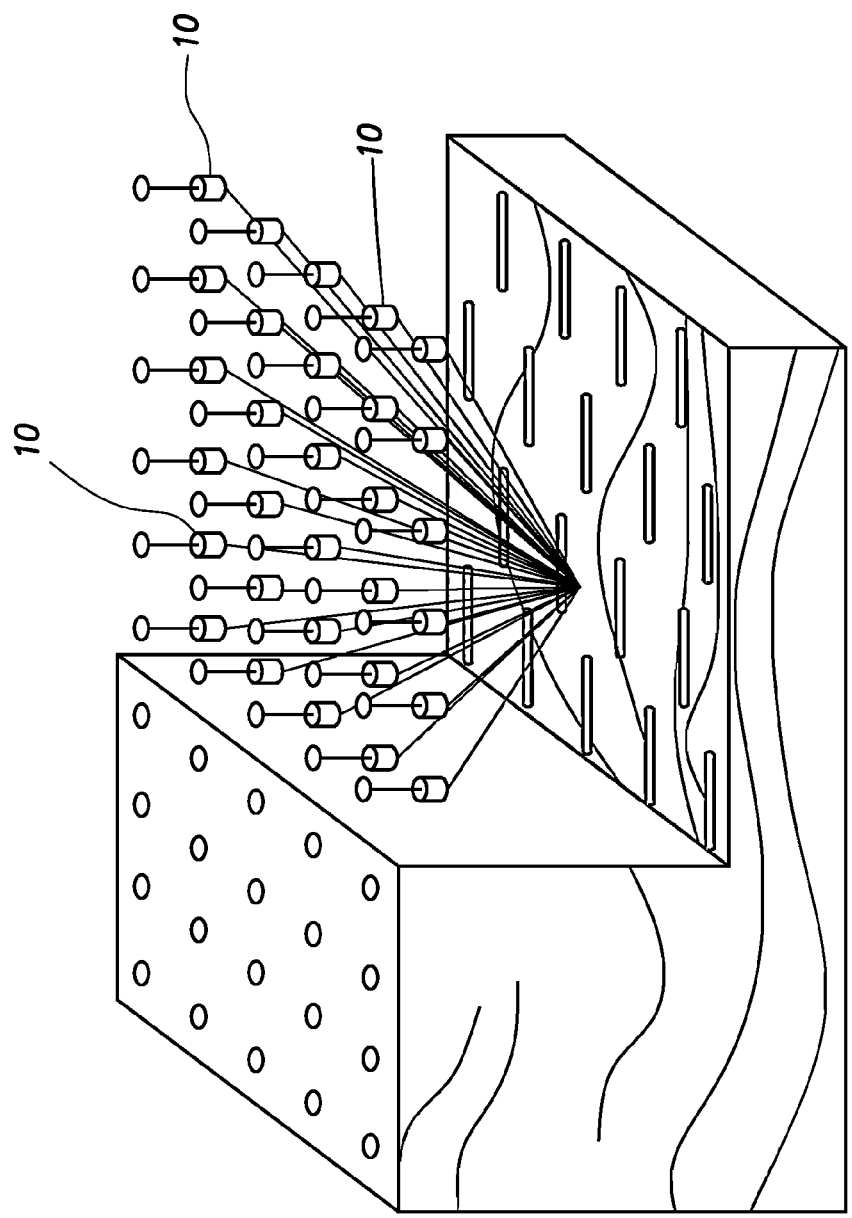

A majority of microseismic monitoring studies are currently performed using downhole sensors 10. However, an alternative is the use of large numbers of sensors 10 deployed at the surface. A typical surface monitoring study (see FIG. 7B) may consist of: many sensors (e.g., perhaps 1000 or more) placed on the surface above a region of activity (e.g., perhaps about 2.5 km from the source), with each sensor measuring a single component of motion. In other examples, the sensors can measure multiple components of motion. Diffraction stack imaging can be used to locate events.

In general, signals from microseismic events are not readily visible above noise levels in surface recordings. However, the use of stacking and imaging methods provides a means to enhance these arrivals.

At this stage, it is important to make a distinction between the geometry used to collect microseismic data (surface versus downhole) and the methodology used to locate microseismic events (waveform attribute versus imaging). Although waveform attribute methods are generally applied to downhole data, and imaging methods are generally applied to surface data, it is contemplated that this does not have to be the case (waveform attribute methods could be applied to surface data, and imaging methods could be applied to downhole data).

Waveform Attribute Based Methods

Figure 8:
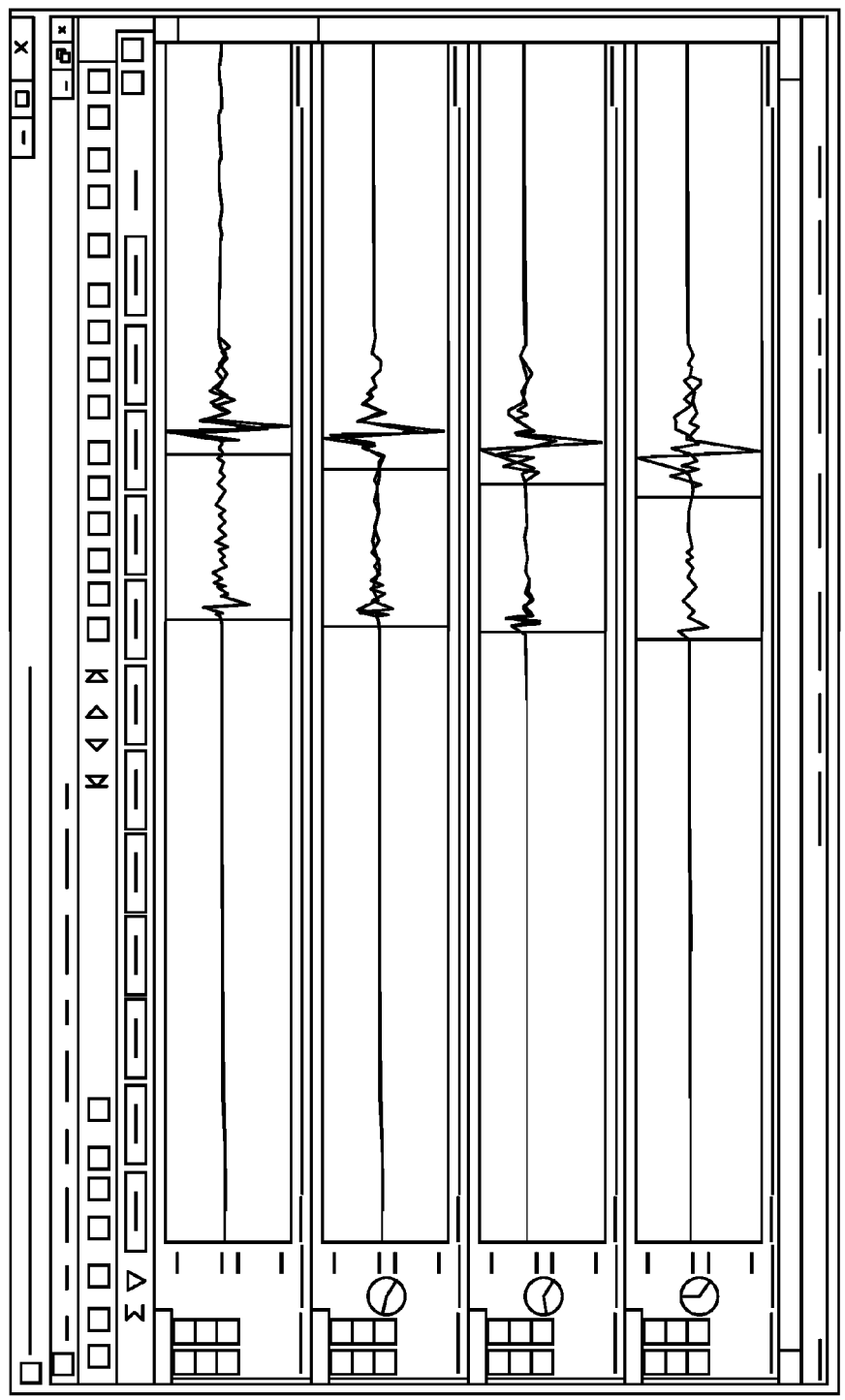
FIG. 8 representatively illustrates an example display of sensor outputs.

A majority of microseismic processing focuses on measurement of waveform attributes, such as arrival times and polarization angles of seismic phases. FIG. 8 depicts an example of a display of individual sensor outputs. This figure also demonstrates an example of arrival picking.

In this example, three seismic traces (one for each component of motion) are generated for each receiver/sensor 10. An analyst or automated procedure picks the arrival times of seismic phases from the event (shown as vertical bars). The relative amplitudes of the different traces for each sensor/receiver will give the polarization of the arrival.

A variety of schemes exist for determining the position of a source from observations of waveform attributes. A simple approach involves minimizing the misfit between observed arrival times, as follows:

$$\min_x |W^o(r) - W^m(r,x)|^p \quad (21)$$

where $W^o(r)$ is an observed waveform attribute at the receiver and $W^m(r,x)$ is a calculated waveform attribute for a source at a position, x, and observed at a receiver, r. The index p is referred to as the norm of the desired solution. Typically, p=2, giving a least squares solution. Equation 21 is a non-linear inverse problem, and is typically solved either though a grid search over potential source locations, or by an iterative procedure known as Geigers method (similar to Gauss-Newton optimization).

Although useful, the waveform attribute approach does not utilize all the available information present in the data. In particular, it generally requires the presence of clear arrivals observable in the seismic records. The requirement for visible arrivals reduces the method's effectiveness at signal to noise ratios close to unity, and makes the approach untenable where signal to noise ratios are less than one.

Diffraction Stack Imaging

To date, reservoir monitoring studies that wish to make use of waveform information to characterize the source do so using a procedure similar to diffraction stack migration. For example, a method proposed by Duncan (2008) uses pre-computed travel time tables to align data for a particular point in the reservoir. The aligned data is then stacked to produce an amplitude for each point and time in the volume of interest (also referred to here as a stack function). The position of sources is inferred from the presence of high values in the stack function. Similar approaches can be found in Baker et al. (2005), Dasgupta (2006), Kochnev et al. (2007), and Chambers et al. (2010).

Figure 9:
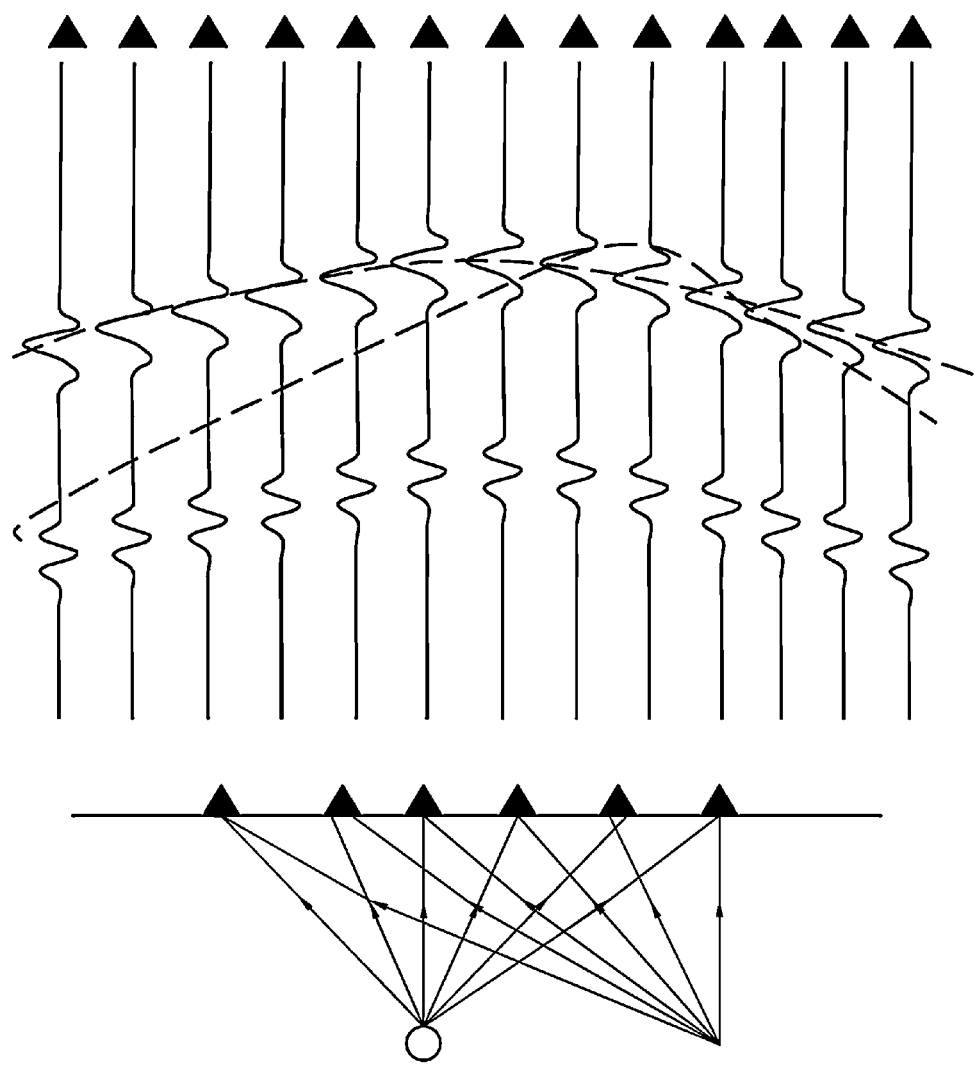
FIG. 9 is a representative diagram demonstrating diffraction stack migration.

FIG. 9 is a diagram representatively depicting diffraction stack migration. On the top are shown data records for a suite of sensors. On the bottom is a cross section showing sensor locations at the surface and sources at depth. The travel time from the image point to each of the sensors follows a moveout (or travel time) curve through the data records.

In FIG. 9, two travel time curves are shown as dashed lines. The flatter of the two corresponds to the true source location (at the dot), whilst the more curved travel time curve corresponds to an incorrect source location to the right of the dot.

When the data amplitudes are summed (stacked) along the correct travel time curve, constructive interference creates a high stack amplitude. When the data amplitudes are summed along an incorrect travel time curve, destructive cancelling results in a low stack amplitude. By working through a grid of image points and origin times, a 4D image is generated in which the high amplitudes correspond to the positions of sources.

Figure 10:
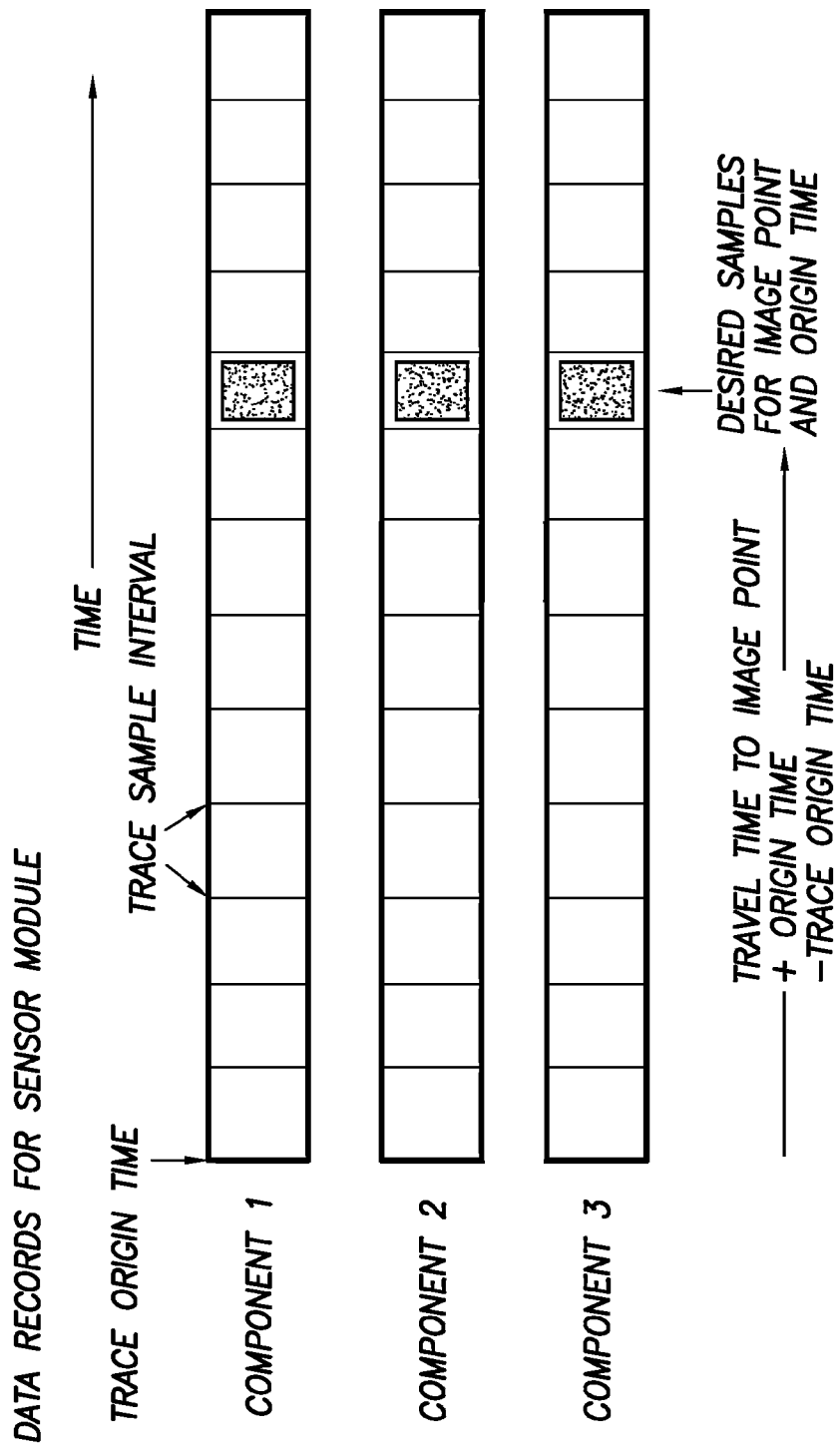
FIG. 10 is a representative diagram demonstrating data selection for a diffraction stack migration approach.

An example procedure for diffraction stack migration is depicted in FIG. 10. Each horizontal row represents a seismic trace, with each square being a sample. The desired samples for an image point are determined by the desired origin time and the travel time for the seismic phase from the image point to the receiver.

Basically, the procedure is as follows:
1. Pre-compute travel times from receivers to a grid of image points in the region of interest.
2. Pick an image point and origin time in the subsurface.
3. Using the travel time from the image point to each receiver, select the data from each sensor that could have come from that image point and origin time (e.g., see FIG. 9).
4. Stack the selected data.
5. Repeat for next image point and origin time.

The above procedure can be numerically optimized/tuned for hardware and software implementations.

The diffraction stack approach has the advantage that it is easily automated, and works when the arrivals from microseismic events are not visible in the pre-processed data. This makes the technique well suited to large arrays of surface sensors.

Mathematically, the diffraction stack procedure is expressed as a stack function:

$$I(x,\tau) = \int w(r;x,\tau) d(r, t=\tau+T(r,x)) dr \quad (22)$$

where $I(x,\tau)$ is the imaged value, $d(r, t=\tau+T(r,x))$ is the data sample for a single component sensor, with the time consistent with an arrival from the image point. $w(r; x, \tau)$ are the summation weights for each sensor.

Various different weights are possible depending upon the type of stack function desired. For example:

$$w(r;x,\tau)=1/N \quad (23)$$

corresponds to an average value (assuming there are N sensors), while $$w(r;x,\tau) = \frac{d(r, t = \tau + T(r, x))}{N \int d(a, t = \tau + T(a, x))^2 da} \quad (24)$$

corresponds to a semblance stack.

The result of the diffraction stack is a four-dimensional (4D) data cube (three spatial dimensions, as well as origin time), in which image points with high amplitudes correspond to the positions of sources. In many cases, it is desirable to display the source(s) as points in space and time rather than as an image. Accordingly, maxima in the stack function can be selected as potential point source locations (Duncan, 2008).

However, the presence of source mechanisms (e.g., moment tensors) creates additional problems when imaging seismic sources. Radiation patterns for seismic waves from moment tensor sources (e.g., as discussed above and depicted in FIGS. 5A & B) can cause amplitude and polarity changes across large arrays of sensors 10. This, is turn, creates complicated focusing patterns which depend on the positions of the sensors relative to the source.

Figure 11:
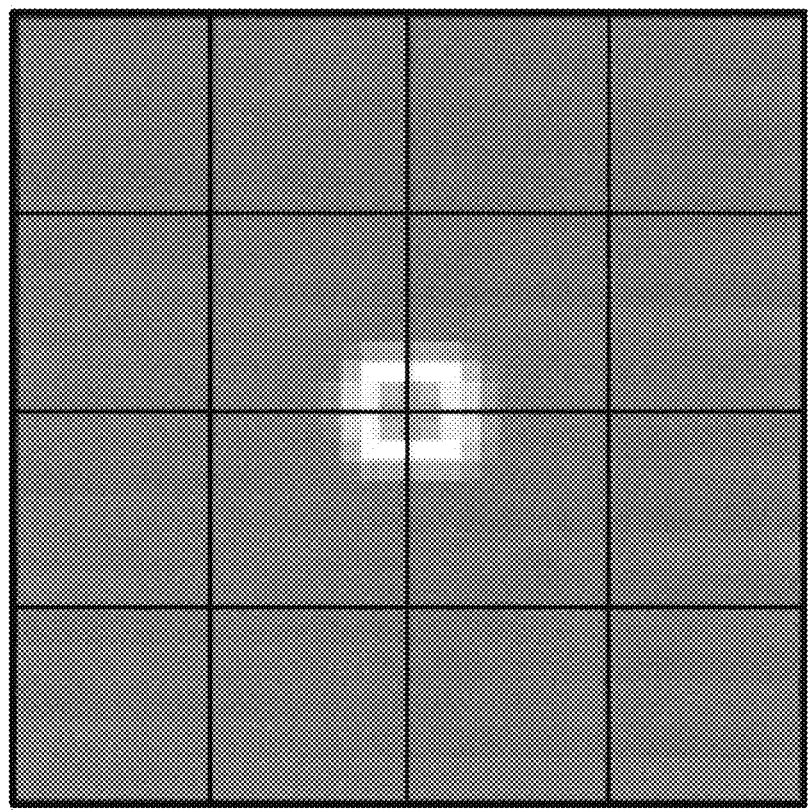
FIG. 11 is a representative example image for a seismic source obtained through the diffraction stack migration approach.

The presence of a moment tensor source causes distortion of the ideal source image (e.g., as depicted in FIG. 11), in many cases creating a complicated pattern with low stack amplitudes at the source position and high amplitude sidelobes. Until now, practitioners using diffraction stack procedures to locate events have had to locate the source positions from diffraction stack images by selecting maxima of the side-lobes and computing an average (e.g. Eisner et al. (2010)). Polarity and amplitude variations also make the utilization of multiple wave types and multi-component data in diffraction stack imaging problematic.

Recently, several authors have proposed methods for correcting the polarity variations from moment tensor sources, prior to applying diffraction stack approaches. Thornton and Eisner (2011) apply a series of polarity changes to the seismic traces to correct for the source mechanism. Alternatively, it is possible to incorporate the source mechanism into the image space. While effective, these approaches are computationally intensive, in that they require multiple stacks to be computed for each image point.

Figure 12:
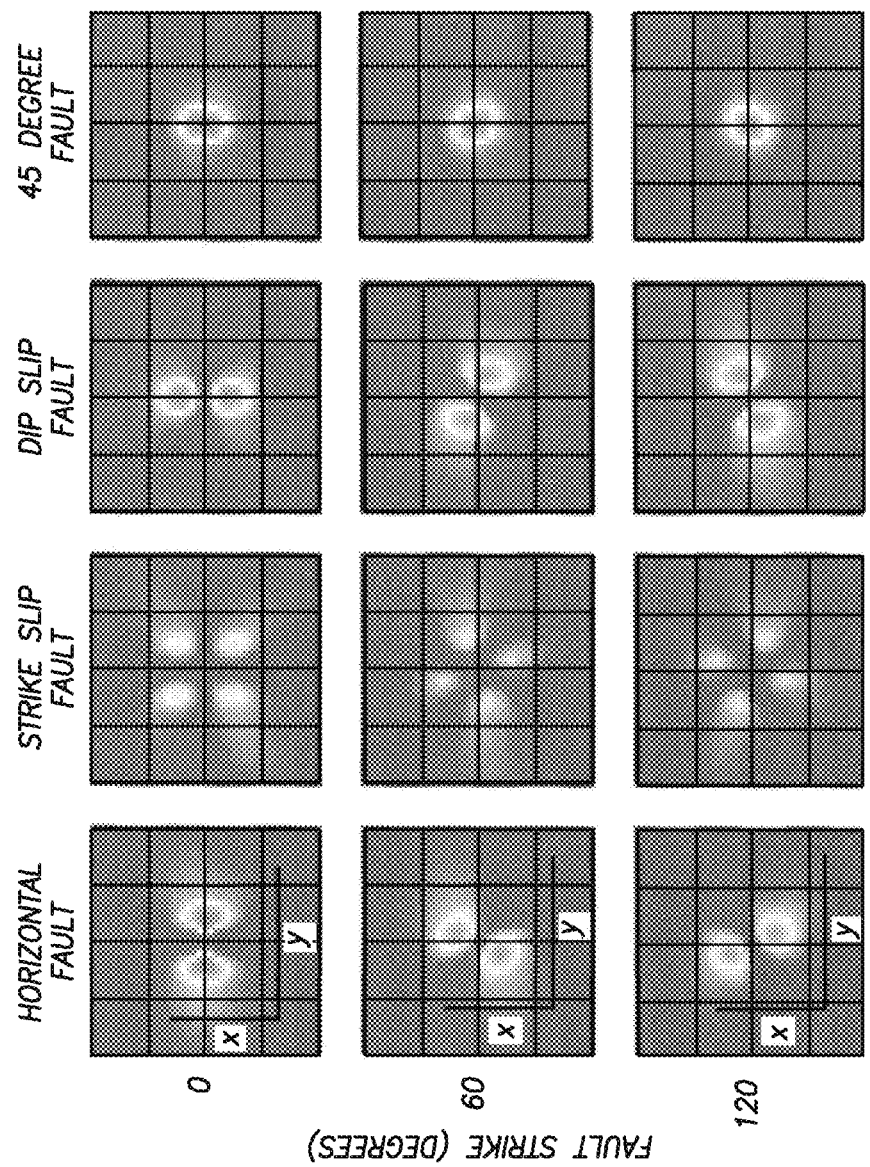
FIG. 12 representatively illustrates a plurality of diffraction stack images obtained using the same geometry as FIG. 11 except with double couple (fault-like) sources.

FIG. 12 representatively illustrates a plurality of diffraction stack images obtained using the same geometry as FIG. 11, except with double couple (fault-like) sources. The moment tensor produces variations in the polarity of the P-wave. In many cases, the varying polarity causes low or zero stack amplitudes at the true source position with high amplitude side-lobes creating a complicated focusing pattern.

Interferometric Source Imaging

Interferometric imaging can be thought of as a variation on the basic diffraction stack approach. The procedure makes use of the identity that a cross-correlation of two traces A and B is the same as convolution of the B with the time reversed signal A. Thus, cross-correlated signals preserve the relative time delay between arrivals at the different sensors.

In other words, if there are two traces recorded at stations A and B, respectively, with arrival times $T_a$, and $T_b$, one can compute a cross-correlated trace using B relative to A, and the arrivals position in the cross-correlated trace will occur at $T_b-T_a$.

Hence the stacking procedure described above can be adapted to use with cross-correlated records $X(r_a,r_b;t)$, giving:

$$I(x) = \int \int w(r_a, r_b, x, t) X(r_a, r_b; t = T(r_b, x) - T(r_a, x)) dr_b dr_a \quad (25)$$

where the summation is performed over all possible reference stations $r_a$ and comparative stations $r_b$.

Figure 13:
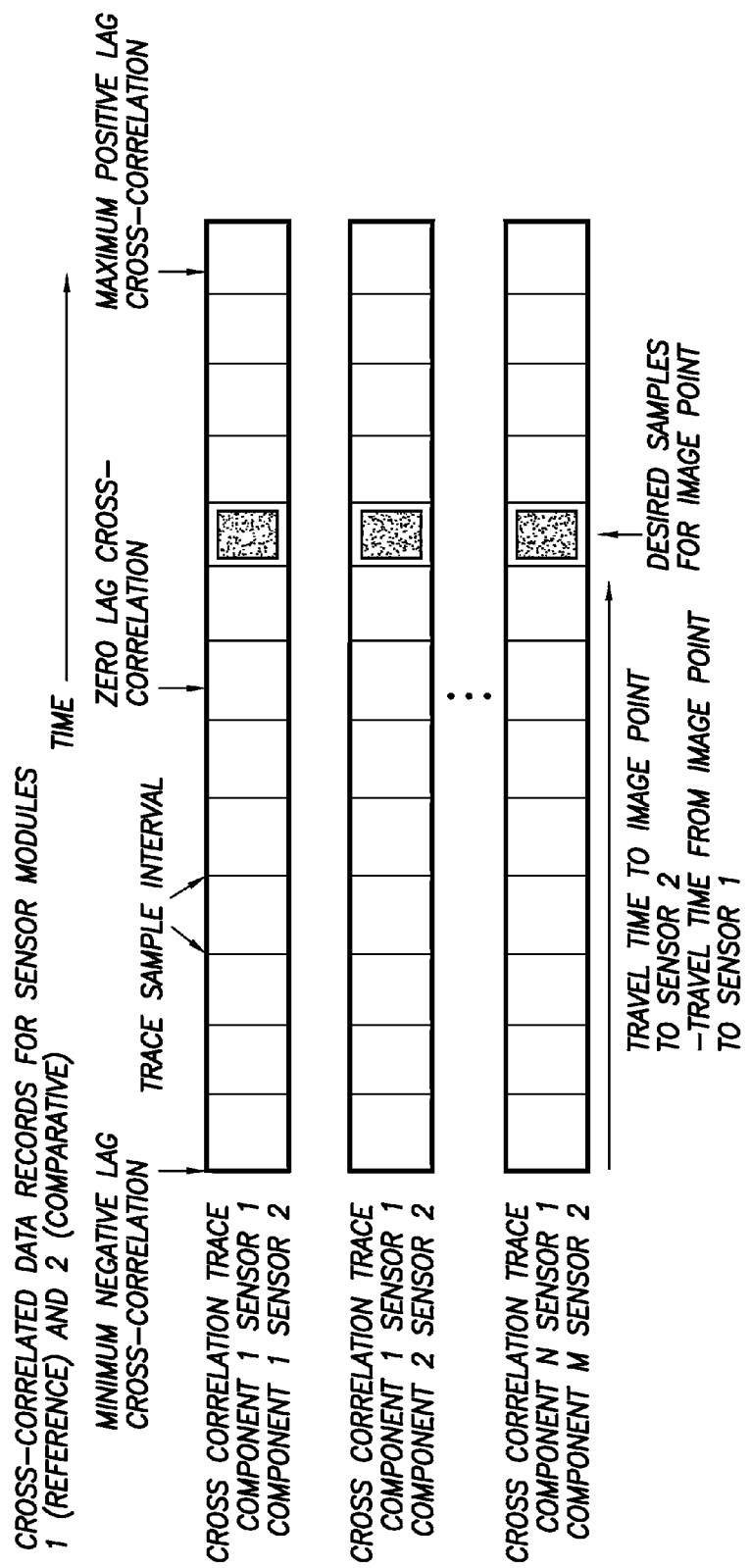
FIG. 13 is a diagram representatively demonstrating data selection for interferometric source imaging.

FIG. 13 demonstrates an example of how data is selected from the cross-correlated traces for stacking. Each horizontal row represents a cross-correlated seismic trace, with each square being a sample. The desired samples for an image point are determined by the travel time from the image point to the comparative station minus the travel time from the image point to the reference station.

The use of relative move-out in the interferometric imaging approach has useful properties of producing images that are not dependent on the origin time, and reducing the computational cost, as it only requires saving a small portion of the cross-correlated signals. Hence, very long traces can be cross-correlated, but only short traces saved to perform the imaging.

However, the procedure is not frequently used due to other problems, such as, crosstalk from multiple arrivals and events can create artifacts in the resulting images, the presence of correlated noise in the data can produce erroneous or misleading results, and the summation requires all pairs of traces, which can be very large.

As with the diffraction stack approach, interferometric imaging does not lend itself easily to multi-component data. The resulting images from moment tensor sources are likely to be even more complicated than in the diffraction stack approach, since the cross correlated traces are not linearly dependent on the moment tensor elements.

An example of the interfermetric imaging approach is given with acoustic data in Norton and Carr (2006).

Beam and Waveform Attribute Migration

Various practitioners have used beam migration style approaches to combine the diffraction stack approach with waveform attributes to map source positions (Rentsch et al. (2007), Drew (2009), Khadhraoui (2009)).

Mathematically, these approaches can be expressed as:

$$I(x)=\int w(r,x)(W^o(r)-W^m(r;x))dr \quad (26)$$

If the summation weights are the data values selected at the correct times:

$$w(r,x)=d(r,t=T(r,x)+\tau) \quad (27)$$

and the attribute is the polarization direction of the P-wave arrival, then Equation 26 becomes a beam migration. This procedure is equivalent to:

1. Measuring the P-wave polarization at each receiver;
2. Using the polarization as the initial starting direction for a cone of rays; and
3. Propagating energy back along the rays and looking for regions where the rays converge.

Figure 14:
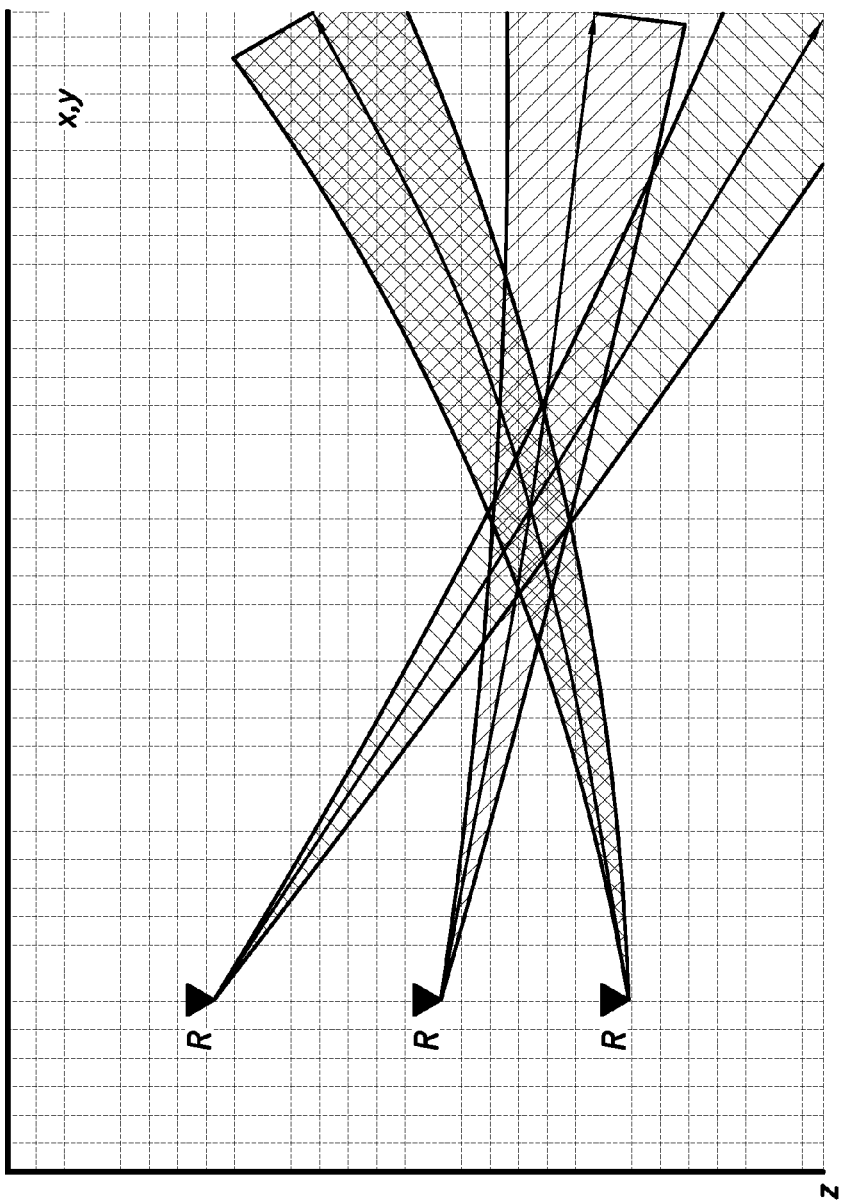
FIG. 14 is a diagram representatively illustrating beam migration.

An example of this procedure is illustrated in FIG. 14, derived from Rentsch, et al. (2007). The measured polarization of the P-wave at each receiver is used to initialize rays R. The rays R will converge at the source location.

In practice, some processed version of the data (such as the envelope function) might be used instead of the actual data values, in order to remove issues related to polarity and subtle waveform changes.

These procedures are typically used in situations where the sensor coverage is not extensive enough to allow the full diffraction stack approach to be effective, but the speed and simplicity of imaging solutions is desired.

Reverse Time Migration

It is possible to use the recorded data signals as a source and numerically back propagate the energy through a known velocity field. Such methods are referred to as boundary value migration (BVM), reverse time migration (RTM) or reverse time imaging (RTI). The resulting series of time steps from the numerical propagation will show the energy focusing at the source position (McMehan (1982, 1985), Gajewski and Tessmer (2005), Artman et al. (2010), Saenger et al. (2010)).

Figure 15A:
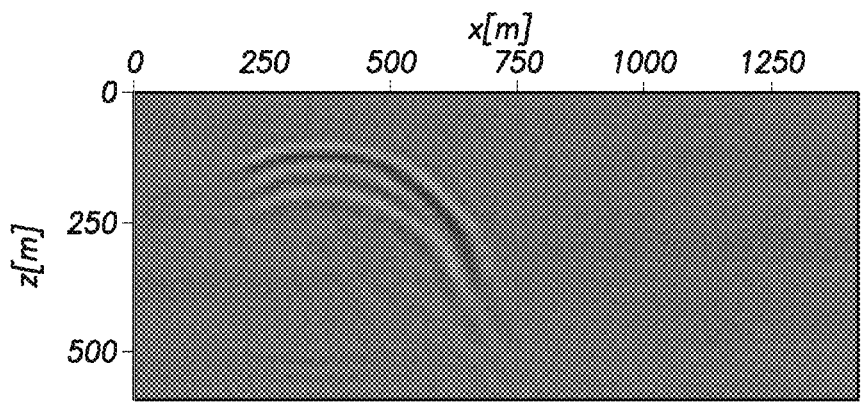
FIGS. 15A-C are representative example snapshots from a reverse time migration to determine a source location.
Figure 15B:
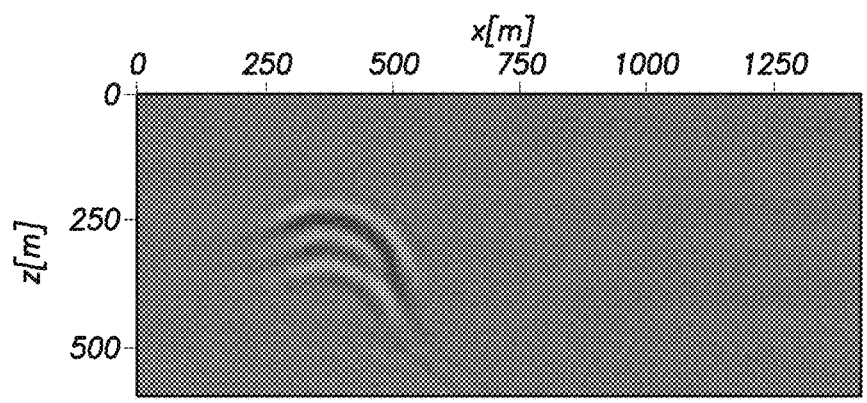
Figure 15C:
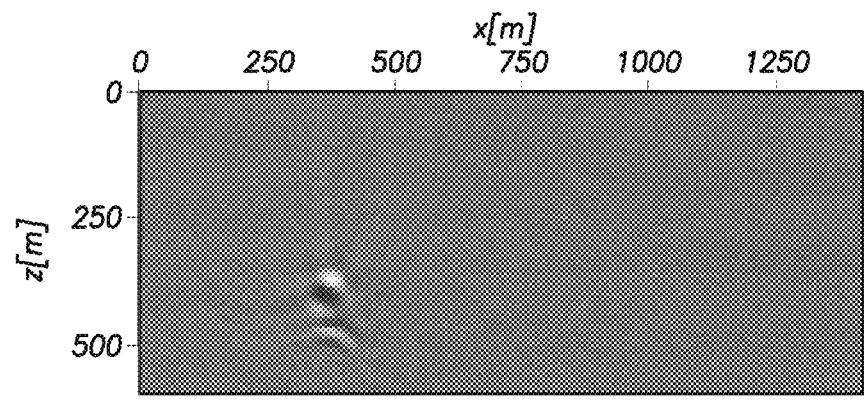

FIGS. 15A-C depict an example of an RTM source location. These figures are derived from Gajewski and Tessmer (2005).

In this case, sensors recorded the wavefield at the top of the model. The recorded traces were then used as input sources for the reverse propagation. The snap shots (progressing sequentially from FIG. 15A to 15C) show the backward propagating wavefield coalescing at the source position and origin time.

As with diffraction stack imaging, the presence of a moment tensor source radiation complicates the focusing pattern produced by reverse time migration. The exact results will depend on the numerical scheme used to back-propagate the wavefield. As an example, if an acoustic simulation is used, the results may be similar to those depicted in FIG. 12.

While less computationally intensive than full inversion, the reverse time approach is still impracticable in many current day applications, where a volume of interest is very large and computing power is finite. Furthermore, a primary efficiency gain from this approach is the simultaneous propagation of the wavefield from all receivers. However, this limits the imaging condition to the minimization of an L2-norm.

Moment Tensor Imaging

Moment tensor imaging attempts to solve the problems created by moment tensor sources and their associated radiation patterns by producing images for each moment tensor component, rather than just a single stack amplitude. The procedure is a form of reverse time migration, and is very closely related to the full waveform inversion discussed above, and as outlined by Kawkatsu and Montagner (2008). Ideally, it would be desirable to invert Equation 10:

$$m = (\hat{G}^*\hat{G})^{-1}\hat{G}^*d \quad (28)$$

to obtain a full moment tensor distribution at each point in the region of interest. $\hat{G}^*$ is the adjoint transpose of the Green's functions $\hat{G}$. In many cases:

$$(\hat{G}^*\hat{G})^{-1} \cong \alpha I \quad (29)$$

where $\alpha$ is some real proportionality constant. Accordingly, Equation 28 becomes:

$$m \cong \alpha \hat{G}^* d \quad (30)$$

The link between Equation 28 and reverse time migration is obtained by recognizing that:

$$RHS = \sum_{i=1}^{i=3} \int \hat{G}_{li}^*(r, x, \omega) d_i(r, \omega) dr \quad (31)$$

$$= \sum_{n=1}^{n=3} \int E_{ij}^n(x, r, \omega) d_n^*(r, \omega) dr$$

where $E_{ij}^n(x,r,\omega)$ is the element of the strain tensor observed at x due to point source directed in the $n^{th}$ direction at r. $d_n^*(r,\omega)$ is the complex conjugate of the Fourier transformed data (which amounts to a time reversal). So, the moment tensor image is basically the time-reverse image computed using a different reverse Green's function, $E_{ij}^n$. The stress Green's function $E_{ij}^n(x,r,\omega)$ is given by:

$$E_{ij}^n(x, r, \omega) = c_{ij}\left(\frac{\partial G_{in}(x, r, \omega)}{\partial r_j} + \frac{\partial G_{jn}(x, r, \omega)}{\partial r_i}\right) \quad (32)$$

Hence, we obtain a reverse time migration expression giving the moment tensor at each image point:

$$m_{ij}(x, \omega) \cong \alpha \sum_{m=1}^{i=3} \int E_{ij}^m(x, r, \omega) d_m^*(r, \omega) dr \quad (33)$$

Only very few studies have applied Equation 33 to determine source properties (Nath Gharti et al., 2011). This may be partly because application of Equation 33 requires one of: explicit computation and or storage of the stress Green's functions relating each component direction at each sensor to the moment tensor component at each image point in the monitored volume, or an "on the fly" type approach (such as reverse time migration), whereby the Green's function's action on the data is computed as the receiver wavefield is back propagated.

As an example of the computational issues associated with constructing a library of Green's functions for a realistic microseismic survey, consider a case with the following: 2000 single component time samples (leading to 1025 frequency samples), 1000 sensors, monitored volume consisting of a 61×61×61 cube, and 6 Green's functions (one for each independent moment tensor component) per point. Based on two 32-bit floats for each complex value to store the Green's functions, this leads to a library of approximately 10.14 TB. The size of this library would put considerable strain on current computing resources, increasing the cost of the procedure and turn-around time for results.

Alternatively, the "on the fly" approach suffers from a problem that the monitored volume is often relatively small relative to the area of the array. For example, a typical monitored volume might be a cube with sides of 1 km, whilst the surface array aperture might be 6 km. Hence, the reverse propagation of the wavefield takes place in a very large volume (approx. 6×6×3 km) of which we are only interested in a very small portion. Most of the computational effort is taken up with the propagation of the wavefield from the receiver positions to the region of interest.

Finally, both approaches require the computation of full elastic Green's functions and/or simulation of the full elastic wavefield at high frequencies. In itself this can be a time consuming and computationally intensive task.

Full Waveform Inversion

As mentioned above, it is possible to invert waveform data for source properties by solving Equation 10 for the vector describing the full moment tensor at each point in the region of interest. However, the computational effort required to do this makes it impracticable in most situations.

In addition to requirements of a limited number of sensors and size of monitored volume, applications of waveform inversion to date have also required either an approximate inversion scheme (Vera Rodriguez et al. (2010)), or the restriction of solutions to the minimization of an L2-norm (Leaney et al. (2008) and Kawakatsu and Montagner (2008)). The latter can be heavily biased toward outlying residuals.

The computational issues associated with a full wave form inversion are the same as or similar to those encountered with moment tensor imaging. Except, in this case, the issues are exacerbated by a necessity to compute and invert the elements of the inner product matrix $\hat{G}*\hat{G}$, in Equation 28.

Other Methods

Practitioners of the art have previously focused on the retrieval of the source location and source properties, such as moment tensor elements. Many studies choose to perform the determination of source location and source properties as separate steps. For example, Eisner et al. (2010) use the diffraction stack approach to locate source positions for selected events. The authors then solve for moment tensor elements at the source location.

This is equivalent to solving Equation 10 with a moment tensor vector consisting of just the six independent elements at a single point. While this approach provides a fast and tractable solution to the problem of determining source location and properties, it ignores trade-offs between source position and moment tensor components, which can be significant.

Moment Tensor Migration Imaging

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another.

Moreover, attention will necessarily be paid to proper engineering practices for the environment in question. It will be appreciated that such development efforts might be complex and time-consuming, outside the knowledge base of typical laymen, but would nevertheless be a routine undertaking for those of ordinary skill in the relevant fields.

It would be desirable to provide a method for the simultaneous determination of source location and moment tensor elements (such as moment tensor imaging) but with computational speed and efficiency comparable to the diffraction stack procedure. In examples described below, such a method is provided to the art.

In one embodiment, reference is made to Equation 50, where the moment tensor imaging approach is cast in a form similar to a diffraction stack procedure. The method is then further developed to use a (faster) ray-angles only approximation, as by Equation 57. Finally, the method is adapted to the case of cross-correlated waveforms, as in interferometric imaging (Equations 64 and 65).

Overview of One Embodiment

Throughout the following description, it is assumed that the method is applied to the processing of microseismic data collected for reservoir development and production monitoring. However, the method has much broader application. Within seismology and the earth sciences, potential areas of application can also include mining and geothermal environments, glaciology, volcanology, and tectonic studies.

General conditions for application of the method can be broadly cast as follows: there is a desired knowledge of an unknown moment tensor source, there exist remotely sensed data that can be modeled using the convolution of the signal from one or more moment tensor sources with ray theoretical Green's functions, and the principle of reciprocity holds for the ray based Green's functions. That is, the same result is obtained if source and receiver positions are interchanged.

Ray Based Moment Tensor Imaging

The equations for P-wave and S-wave ray-based synthetics in heterogenous media (Equations 17 and 18) can be summarized as:

$$u_q^M(r,t;x,\tau) = \frac{A^M(r,x)}{R^M(r,x)} H^K\{\delta(t-T^M(r,s)-\tau)\} \times \sum_{i=1}^{i=3} \Gamma_{qi}^M(r,x) \sum_{j=1}^{j=3}\sum_{k=1}^{k=3} F_{ijk}^M(r,x) m_{jk}(x,\tau) \quad (34)$$

where the superscript M refers to the propagation mode. $F_{ij}^M$ now describes the radiation pattern for the moment tensor source:

$$F_{ijk}^M = \begin{cases} \gamma_i \gamma_j \gamma_k, & M=P \\ (\delta_{ij}-\gamma_i\gamma_j)\gamma_k & M=S \end{cases} \quad (35)$$

where $1/R^M(r,x)$ is the geometrical spreading factor $$\left(\frac{\partial \Omega}{\partial S}\right)^{\frac{1}{2}},$$

and the scalar amplitude factor $$\frac{1}{4\pi\rho(x)v^3(x)}\left(\frac{v(x)\rho(x)}{v(r)\rho(r)}\right)^{\frac{1}{2}}$$

has been incorporated into the ray amplitude $A^M(r,x)$.

Comparison with Equation 11 shows that a version of Equation 34 for each arrival phase can be combined to form the far-field response. Hence:

$$d_i(r,t) = \int\int \sum_{M=1} u_q^M(r,t;x,\tau)dxd\tau \quad (36)$$

Expanding, we obtain:

$$d_i(r, t) = \int \sum_{M=1} \frac{A^M(r, s) H^K \{\delta(t - T^M(r, s) - \tau)\}}{R^M(r, s)} \sum_{i=1}^{i=3} \Gamma_{qi}^M(r, s) \times \sum_{j=1}^{j=3} \sum_{k=1}^{k=3} F_{ijk}^M(r, s) * m_{jk}(s, \tau) ds \quad (37)$$

By comparing Equation 37 with Equation 6 it can be seen that the ray based Green's function for a heterogenous medium is given by:

$$G_{qj,k}(r, s, t) = \sum_{M=1} \frac{A^M(r, s) H^K \{\delta(t - T^M(r, s) - \tau)\}}{R^M(r, s)} \sum_{i=1}^{i=3} \Gamma_{qi}^M(r, s) F_{ij}^M(r, s) \quad (38)$$

In the frequency domain, Equation 38 becomes:

$$G_{qj,k}(r, s, \omega) = \sum_{M=1} \frac{A^M(r, s)}{R^M(r, s)} \sum_{i=1}^{i=3} \Gamma_{qi}^M(r, s) F_{ijk}^M(r, s) e^{-i(\omega T_M(r,s) + K\pi/2)} \quad (39)$$

Equation 39 can now be used as a basis for an operator that will project data onto moment tensor components, allowing it to be used in moment tensor migration imaging. Equation 32 can be written as:

$$E_{ij}^n(x, r, \omega) = c_{ij}(G_{in,j}(x, r, \omega) + G_{jn,i}(x, r, \omega)) \quad (40)$$

Substituting in Equation 39 we obtain:

$$E_{ij}^n(x, r, \omega) = c_{ij} \sum_{M=1} \frac{A^M(x, r)}{R^M(x, r)} \left( \sum_{l=1}^{l=3} \Gamma_{il}^M F_{lnj}^M(x, r) + \sum_{l=1}^{l=3} \Gamma_{jl}^M F_{lni}^M(x, r) \right) e^{-i(\omega T_M(r,x) + K\pi/2)} \quad (41)$$

Now Equation 41 is in a form in which it can be used with the moment tensor imaging formula (Equation 33) to obtain a ray based moment tensor imaging approach:

$$m_{ij}(x, \omega) \cong \\ \alpha \sum_{n=1}^{n=3} \int c_{ij} \sum_{M=1} \frac{A^M(x, r)}{R^M(x, r)} \left( \sum_{l=1}^{l=3} \Gamma_{il}^M F_{lnj}^M(x, r) + \sum_{l=1}^{l=3} \Gamma_{jl}^M F_{lni}^M(x, r) \right) \\ e^{-i(\omega T_M(r,x) + K\pi/2)} d_n^*(r, \omega) dr \quad (42)$$

Note that, although Equation 42 invokes the summation over the three components of motion at each sensor, this does not have to be the case. The moment tensor imaging will work with single component data.

The equation can also be simplified by recognizing that the term in brackets is a matrix with non-dimensional components that projects the data, $d_o$ onto moment tensor components:

$$\Psi_{ijn}^M(x, r) = \sum_{l=1}^{l=3} \Gamma_{il}^M F_{lnj}^M(x, r) + \sum_{l=1}^{l=3} \Gamma_{jl}^M F_{lni}^M(x, r) \quad (43)$$

The use of ray based Green's functions for moment tensor imaging has several advantages relative to numerical methods. For example, most or all of the quantities in Equation 42 can be stored in a series of lookup tables. For example, a suite of rays can be propagated from each receiver location and, as they pass through the region of interest, desired quantities can be interpolated at a grid of points.

Desired quantities could include the arrival and take-off angles used to compute $\Psi_{ijn}^M(x,r)$, the amplitude factors used to compute $$\frac{A^M(x, r)}{R^M(x, r)},$$

and the travel time, $T(x,r)$. The size of these lookup tables are several orders of magnitude smaller than what is required to store the entire Green's function (which is used to apply Equation 33 directly).

Where the lookup table approach is used, the efficacy of the method does not depend on the size of the modeled volume. Rather, it depends on size of the region of interest (e.g., the volume over which the image is calculated, and not the volume through which the wavefield is propagated).

The method allows for the use of either single or multi-component data. Standard diffraction stack approaches use single component waveform data. Alternatively, beam forming or waveform attribute migration use a mixture of diffraction stack and waveform attributes with multi-component data.

Equation 42 allows for the arbitrary inclusion of different wavefield phases and propagation modes. For example, any combination of direct P and S, as well as reflected, transmitted or converted, waves is possible. Reverse time and waveform inversion implemented by numerical procedures generally require the incorporation of all wavefield phases.

Equation 42 allows for the detection of smaller magnitude events. By projecting the data onto moment tensor components, the method ensures coherent summation of the entire dataset at the source position, something that is not done in the standard diffraction stack or reverse time approaches.

Relationship Between Ray Based Moment Tensor Imaging and

Diffraction Stack Migration

Although Equation 42 provides a significantly faster and more practical alternative to direct imaging of the moment tensor, it can lose some of the speed and simplicity of the diffraction stack imaging approach. For example, to apply Equation 42 directly requires a Fourier transform of the trace for each moment tensor component at each image point, which can be time consuming.

Furthermore, applying Equation 42 directly lacks some of the flexibility of the diffraction stack approach that comes from being able to weight the summation over receivers. However, Equation 42 can be manipulated into a form where an implementation as a diffraction stack imaging procedure is possible.

Transferring the complex conjugate to the Green's function (rather than the data):

$$m_{ij}(x, \omega) \cong \alpha \sum_{n=1}^{n=3} \int c_{ij} \sum_{M=1} \frac{A^M(x, r)}{R^M(x, r)} \Psi_{ijn}^M(x, r) e^{+i(\omega T_M(r,s) + K\pi/2)} d_n(r, \omega) dr \quad (44)$$

Transferring the stationary phase shift associated with KMAH changes along the ray path to the data term:

$$m_{ij}(x, \omega) \cong \alpha \sum_{n=1}^{n=3} \int c_{ij} \sum_{M=1} \frac{A^M(x, r)}{R^M(x, r)} \Psi_{ijn}^M(x, r) e^{+i\omega T_M(r,s)} d_n(r, \omega) e^{+iK\pi/2} dr \quad (45)$$

Transforming back to the time domain, we obtain:

$$m_{ij}(x, t) \cong \alpha \sum_{n=1}^{n=3} \int c_{ij} \sum_{M=1} \frac{A^M(x, r)}{R^M(x, r)} \Psi_{ijn}^M(x, r) \times \delta(t + T_M(x, r) - t') * H^{-K} \{d_n(r, t')\} dr \quad (46)$$

which by the shifting property of the delta function becomes:

$$m_{ij}(x, t) \cong \alpha \sum_{n=1}^{n=3} \int c_{ij} \sum_{M=1} \frac{A^{M*}(x, r)}{R^M(x, r)} \Psi_{ijn}^M(x, r) \times H^{-K} \{d_n(r, t + T_M(x, r))\} dr \quad (47)$$

Finally shifting the origin of the time axis back to t=T we obtain:

$$m_{ij}(x, \tau) \cong \alpha \sum_{n=1}^{n=3} \int c_{ij} \sum_{M=1} \frac{A^M(x, r)}{R^M(x, r)} \Psi_{ijn}^M(x, r) \times H^{-K} \{d_n(r, t = \tau + T_M(x, r))\} dr \quad (48)$$

Equation 48 is now in a format similar to the formula for diffraction stack imaging (Equation 22). Substituting:

$$w(r; x, \tau) = c_{ij} \sum_{M=1} \frac{A^{M*}(x, r)}{R^M(x, r)} \Psi_{ijn}^M(x, r) \quad (49)$$

yields the image for a moment tensor component as a linear stack. In other words, the weight of a data sample in the stack is determined by the projection operator.

However, Equation 48 does not have to be applied this way. For example, instead of substituting the projection operator for the diffraction stack weight, it might be desirable to substitute the projected data for the diffraction stack data, d(r, t=τ+T(r,x)), in Equation 22. Thus Equation 47 becomes:

$$m_{ij}(x, \tau) \cong \alpha \int \sum_{n=1}^{n=3} c_{ij} \sum_{M=1} w^M(r; x, \tau) \frac{A^M(x, r)}{R^M(x, r)} \Psi_{ijn}^M(x, r) \times H^{-K} \{d_n(r, t = \tau + T_M(x, r))\} dr \quad (50)$$

where we have also swapped the order of the summations over the data components, n, with that over the receivers, r, and included a weight term for each propagation phase, $w^M(r; x,\tau)$. Equation 50 is now in a form where it retains the speed and flexibility of the diffraction stack approach, but allows for the scope of imaging moment tensor components, and incorporation of multiple propagation modes and data components.

Note that, where the source-receiver ray path has undergone triplications and corresponding increments in the KMAH index, it is preferable to migrate the inverse Hilbert transform of the data rather than the data itself. However, the symmetry of Hilbert transforms, namely:

$$H^{-4}\{x\} = H^0\{x\} = x$$

$$H^{-2}\{x\} = -x$$

$$H^{-3}\{x\} = -H^{-1}\{x\} \quad (51)$$

means that in practice only the data and its inverse Hilbert transform are actually used, together with a sign term.

Ray Angles Only Approximation

Equation 48 and Equation 50 can be further approximated by recognizing that the terms α and $$\frac{A^M(x, r)}{R^M(x, r)}$$

are just scalar amplitude adjustments. Going back to Equation 28, the normal equation for full waveform inversion can be written as:

$$\int \left( \sum_{j=1}^{j=6} \int \hat{G}_{ij}^*(r, x', \omega) \hat{G}_{ji}(r, x, \omega) dr \right) m_j(x, \omega) dx = \int \sum_{j=1}^{j=6} \hat{G}_{ij}^*(r, x', \omega) d_i(r, \omega) dr \quad (52)$$

where we have reverted to describing the moment tensor and the Green's function in un-wrapped form. In the imaging approximation used for moment tensor imaging in the discussion above, the inner product matrix was approximated as:

$$\sum_{j=1}^{j=6} \int \hat{G}_{ij}^*(r, x', \omega) \hat{G}_{ji}(r, x, \omega) dr \cong \alpha \delta_{li} \delta(x - x') \quad (53)$$

However, an alternative approximation might be:

$$\sum_{j=1}^{j=6} \int \hat{G}_{ij}^*(r, x', \omega) \hat{G}_{ji}(r, x, \omega) dr \cong \alpha(x) \delta_{li} \delta(x - x') \quad (54)$$

where $\alpha(x)$ is a non-zero scalar. The factor $\alpha^{-1}(x)$ can be thought of as a compensation for energy loss due to wave propagation. It will ensure that image points in different positions with the same source magnitude produce the same magnitude of source in the imaged solution.

Using Equation 52 with Equation 33 we obtain:

$$m_{ij}(x, \omega) \cong \alpha^{-1}(x) \sum_{m=1}^{i=3} \int E_{ij}^m(x, r, \omega) d_m^*(r, \omega) dr \quad (55)$$

and similarly we can carry through to the ray based approximation to moment tensor imaging to get:

$$m_{ij}(x, \omega) \cong \alpha^{-1}(x) \quad (56)$$

$$\sum_{n=1}^{n=3} \int c_{ij} \sum_{M=1} \frac{A^M(x, r)}{R^M(x, r)} \Psi_{ijn}^M(x, r) \times e^{+i(\omega T_M(r,s) + K\pi/2)} d_n(r, \omega) dr$$

The ray-angles only approximation is made by assuming:

$$\alpha^{-1}(x) \int \sum_{M=1} \frac{A^M(x, r)}{R^M(x, r)} dr \cong k \quad (57)$$

where k is a non-zero scalar. In other words, the amplitude scaling factor, $\alpha^{-1}(x)$, multiplied by the sum of the ray amplitude factors, averages out as a constant value across the entire image. Hence, we obtain the ray-angles only approximation of the moment tensor imaging:

$$m_{ij}(x, \omega) \cong k \sum_{n=1}^{n=3} \int c_{ij} \sum_{M=1} \Psi_{ijn}^M(x, r) e^{+i\omega T_M(x,r)} d_n(r, \omega) dr \quad (58)$$

so named because the projection of the data onto the moment tensor components depends on the elements of $\Psi_{ijn}^M(x,r)$, which are determined by the take-off angles for rays leaving the receiver, and the incident angles for rays arriving at the image point.

Equation 58 can also be manipulated into a diffraction stack form giving:

$$m_{ij}(x, \tau) \cong \quad (59)$$

$$k \int \sum_{n=1}^{n=3} c_{ij} \sum_{M=1} w^M(r; x, \tau) \Psi_{ijn}^M(x, r) \times d_n(r, t = \tau + T_M(x, r)) dr$$

The use of the ray-angles only approximation further simplifies the calculations in the imaging approach, as it can be implemented with only storage of the ray-angle in lookup tables. For 3D heterogenous media this means that only seven numbers per image point are used (three direction cosines describing ray take-off angles, three direction cosines describing arrivals angles, and the ray travel time). For media with symmetry, fewer values are needed.

Adaptation to Interferometric imaging

So far, we have discussed the implementation of ray based moment tensor migration as a diffraction stack approach. However, in certain settings it might be desirable to implement the migration as interferometric imaging.

To begin, consider the image computed by a single back projected trace from Equation 33:

$$m_{ij}(x, \omega; r) = \sum_{m=1} E_{ij}^m(x, r, \omega) d_m^*(r, \omega) \quad (60)$$

Define a cross correlation at the image point of two traces back projected from different receivers:

$$X_{ij}(x, \omega; r_a, r_b) = m_{ij}(x, \omega; r_a)^* m_{ij}(x, \omega, r_b) \quad (61)$$

where the signal back propagated from $r_a$ is used as the reference signal. Substituting in Equation 58 and moving the complex conjugates to the stress Green's functions we get:

$$X_{ij}(x, \omega; r_a, r_b) = \quad (62)$$

$$\left(\sum_{m=1} E_{ij}^m(x, r_a, \omega)^* d_m(r_a, \omega)\right)^* \left(\sum_{m=1} E_{ij}^m(x, r_b, \omega)^* d_m(r_b, \omega)\right)$$

Then rewriting we obtain:

$$X_{ij}(x, \omega; r_a, r_b) = \quad (63)$$

$$\sum_{m=1} \sum_{k=1} (E_{ij}^k(x, r_a, \omega) E_{ij}^m(x, r_b, \omega)^*)(d_k(r_a, \omega)^* d_m(r_b, \omega))$$

The term in the second set of brackets is the cross-correlation of two traces. Hence, the interferometric moment tensor image is obtained by comparison with Equation 33:

$$m_{ij}(x, \omega) \cong \quad (64)$$

$$\alpha \int \sum_{m=1} \sum_{k=1} (E_{ij}^k(x, r_a, \omega) E_{ij}^m(x, r_b, \omega)^*) \times (d_k(r_a, \omega)^* d_m(r_b, \omega))$$

$$dr_a dr_b$$

As with the diffraction stack approach, Equation 62 can be adapted to use ray based Green's functions. By substituting in Equation 41 we get:

$$m_{ij}(x, \omega) \cong \quad (65)$$

$$\alpha \int dr_a \int dr_b \times c_{ij} \left( \begin{array}{c} \sum_{M=1} \sum_{m=1} \frac{A^M(x, r_a)}{R^M(x, r_a)} \\ \Psi_{ijm}^M(x, r_a) \sum_{k=1} \frac{A^{M*}(x, r_b)}{R^M(x, r_b)} \Psi_{ijk}^M(x, r_b) \end{array} \right) \times$$

$$e^{-i\omega(T_M(x, r_b) - T_M(x, r_a))} (d_k(r_a, \omega)^* d_m(r_b, \omega))$$

Note that, in the interest of simplifying the above algebra we have assumed the KMAH index for the rays connecting the image point to each receiver is zero. However, if this is not the case, then a compensation can be applied using inverse Hilbert transforms in a manner similar to that described above.

Finally, by proceeding through a development similar to that described above, we obtain a diffraction stack-like formula similar to Equation 25:

$$m_{ij}(x) \cong \alpha \int dr_a \qquad (66)$$

$$\int dr_b \sum_{M=1} w^M(r_a; r_b, x) \times c_{ij} \left( \begin{array}{c} \sum_{m=1} \frac{A^M(x, r_a)}{R^M(x, r_a)} \Psi_{ijm}^M(x, r_a) \\ \sum_{k=1} \frac{A^M(x, r_b)}{R^M(x, r_b)} \Psi_{ijk}^M(x, r_b) \end{array} \right) \times$$

$$X'_{km}(r_a; r_b, t = T_M(x, r_b) - T_M(x, r_a))$$

where $X'_{km}(r_a; r_b, t)$ is the cross correlation of traces $d_k(r_a, t)$ and $d_m(r_b, t)$. A ray-angles only variation of Equation 64 is also possible:

$$m_{ij}(x) \cong k \int dr_a \int dr_b \qquad (67)$$

$$\sum_{M=1} w^M(r_a; r_b, x) \times c_{ij} \left( \sum_{m=1} \Psi_{ijm}^M(x, r_a) \sum_{k=1} \Psi_{ijk}^M(x, r_b) \right) \times$$

$$X'_{km}(r_a; r_b, t = T_M(x, r_b) - T_M(x, r_a))$$

Diffraction Stack Migration Example

Figure 16:
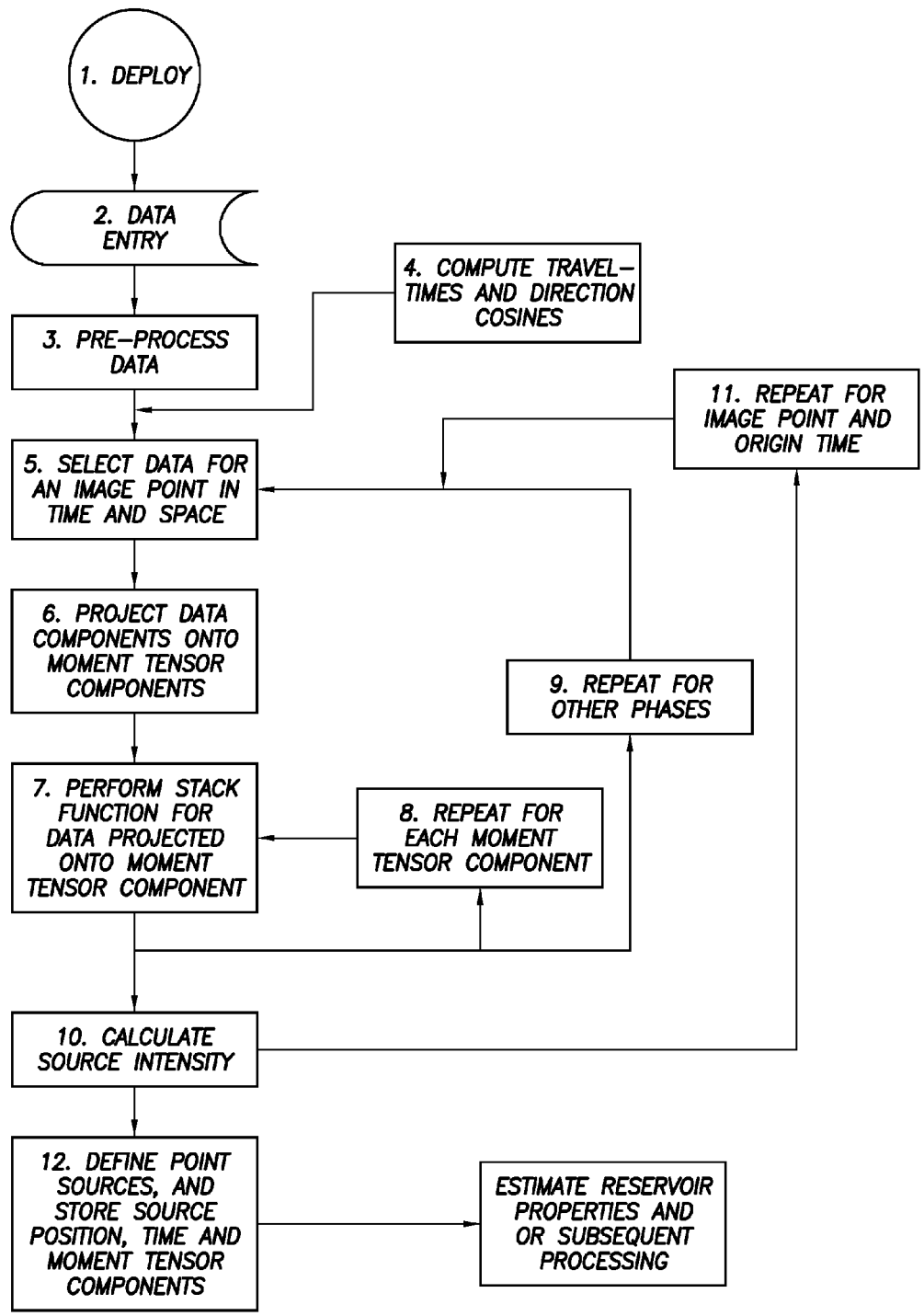
FIG. 16 is a representative flow chart for general implementation of one example of a moment tensor migration imaging method.

In accordance with one example, a general implementation of moment tensor migration imaging as a diffraction stack migration is described as follows:

The procedure basically describes how Equation 50 or Equation 67 can be implemented in a processing work flow. An accompanying flow chart for the processing work flow is representatively depicted in FIG. 16.

Step 1 The processing system is deployed on a device that can record, transfer and manipulate seismic data (e.g., a computer).

Step 2 Seismic data is recorded at receivers/sensors 10 of known position and passed to the processing system. The seismic sensors 10 may consist of one or more vibration sensitive or pressure sensitive components. These vibration sensitive components may be sensitive to vibration in one specific direction. The seismic energy from sources detected by the sensors may or may not be apparent upon initial examination of the data records.

Step 3 The processing system filters and pre-processes the data using standard techniques (such as frequency filtering). If multi-pathed arrivals are to be used, the inverse Hilbert transform (i.e., $H^{-K}\{d_n(r,t)\}$) is computed for each trace.

Figure 17:
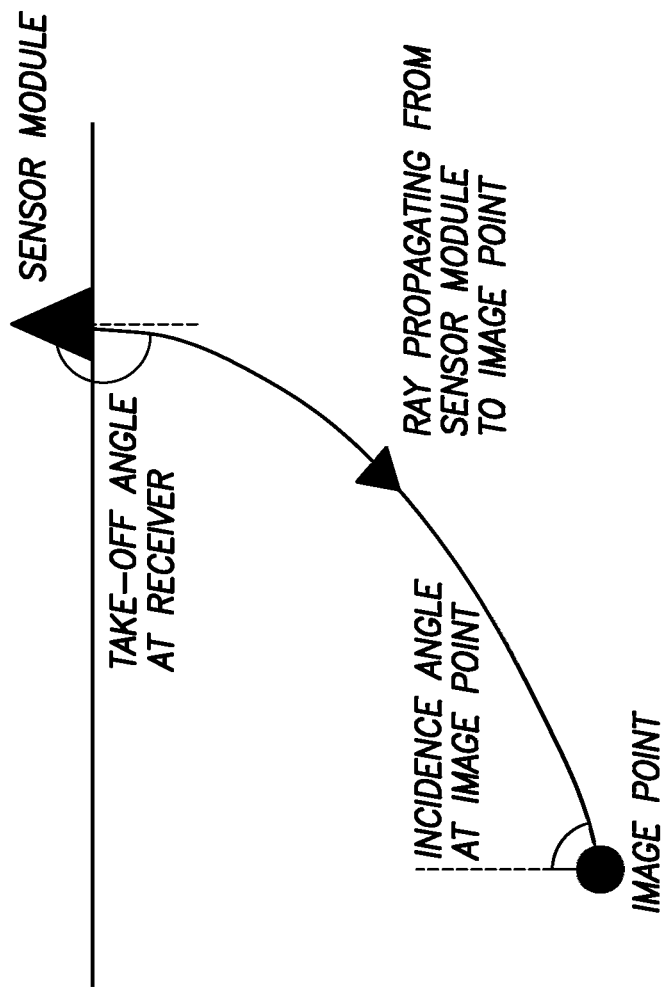
FIG. 17 is a representative diagram of ray geometry between a subterranean image point and a surface sensor module.

Step 4 Quantities necessary to determine the data weights in Equation 50 are computed for rays propagating from each receiver position to a set of image points in the volume of interest. Desired quantities could include the complex ray amplitude $A^M(x,r)$, the geometrical spreading factor $R^M(x,r)$, the source direction cosines or angles $\gamma$, receiver direction cosines, $\eta$, and KMAH index for the ray, K. This is done for each propagation phase of interest, M. FIG. 17 shows a ray propagating from the sensor module to an image point location, along with associated take-off and arrival angles. Data is selected from a sensor 10 using origin time plus the travel time along the ray. The data component(s) can be rotated into moment tensor components using the incidence angles of the rays at the image point and the take-off angles at the receiver.

Step 5 For each receiver and component, n, the data sample is selected for a given image point and origin time (e.g., $H^{-K}\{d_n(r,t=T(r,s)+\tau)\}$). if the value of K is greater than 1, then the symmetries in Equation 1 are used to get the correct value. If a finer spacing of image points is desired than is allowed for by the table construction in step 4, it is possible to interpolate elements of the table at this stage. FIG. 10 diagramatically demonstrates the data selection process.

Step 6 The selected data is projected onto a moment tensor component i,j, by forming the vector $$c_{ij} \frac{A^M(x, r)}{R^M(x, r)} \Psi_{ijn}^M(x, r)$$

from the prior determined quantities in the travel time tables (step 4) and computing the vector product with the selected data $d_n(r,t=\tau+T_M(x,r))$.

Step 7 The projected data are summed according to the desired weights, $w^M(r; x,\tau)$. This produces a cumulative result for the chosen moment tensor component using the chosen propagation phase at the chosen image point and origin time. The summation can take a variety of forms depending on the chosen weights (including summation, averaging or other descriptive statistics).

Step 8 Repeat step 7 for the other moment tensor components.

Step 9 Repeat steps 5 through 8 for additional propagation phases. The results from each phase are combined to produce a cumulative result for each moment tensor component at the chosen image point and origin time.

Step 10 A source intensity or strength is calculated using the moment tensor components for the image point and origin time (step 9). For example, the source intensity could be computed as the sum of the squares of the moment tensor components. However, the source intensity could be any scalar measure of the combined magnitude of the moment tensor components at an image point.

Step 11 Repeat steps 5 through 10 for each image point and origin time in the volume of interest.

Step 12 Point source locations are selected from the source intensity function.

Diffraction Stack with Projection Example

The procedure of the Diffraction Stack Migration Example described above embodies an implementation of Equation 50 or Equation 67, where a stacking loop is over both spatial image point and origin time. However, seismic data is often stored in computer memory as traces or a series of samples representing seismic traces, and considerable computational gains can be made by reordering the loops in the above procedure so as to exploit the memory locality.

The details of an optimal procedure will depend on the available hardware and data volume. However, the following is a guide for persons of ordinary skill as to how the procedure can be accelerated on most computer systems, assuming the data samples are ordered by component, then by time sample, and finally by receiver.

Step 1 The processing system is deployed on a device that can record, transfer and manipulate seismic data (e.g., a computer).

Step 2 Seismic data is recorded at receivers of known position and passed to the processing system. The seismic sensors may consist of one or more vibration sensitive or pressure sensitive components. These vibration sensitive components may be sensitive to vibration in one specific direction. The seismic energy from sources detected by the sensors may or may not be apparent upon initial examination of the data records.

Step 3 The processing system filters and pre-processes the data using standard techniques (such as frequency filtering). If multi-pathed arrivals are to be used, the inverse Hilbert transform (i.e., $H^{-K}\{d_n(r,t)\}$) is computed for each trace.

Step 4 Quantities necessary to determine the data weights in Equation 50 are computed for rays propagating from each receiver position to a set of image points in the volume of interest. Desired quantities could include the complex ray amplitude $A^M(x,r)$, the geometrical spreading factor $R^M(x,r)$, the source direction cosines or angles $\gamma$, receiver direction cosines, $\eta$, and KMAH index for the ray, K. This is done for each propagation phase of interest, M.

Step 5 A projection vector $$c_{ij} \frac{A^M(x,r)}{R^M(x,r)} \Psi_{ijn}^M(x,r)$$

is computed for the first receiver.

Step 6 Data is selected for an image point and the earliest desired origin time (e.g., $d_n(r,t=T_M(x,r))$).

Step 7 The data vector is projected on the moment tensor components.

Step 8 The projected data is added to a running sum for each moment tensor component. The running sums used will be determined by the nature of the stack function (e.g., the weights). For example, if semblance is used, then a running sum and sum of squares is used.

Step 9 Steps 6-8 are repeated for the next origin time until all desired origin times have been done.

Step 10 Steps 5-9 are repeated for each receiver.

Step 11 The running sums are combined to produce a stack function for each origin time at the image point.

Step 12 Steps 5-11 are repeated for other phases, and the results are combined to produce a cumulative stack function for each origin time at the image point.

Step 13 A source intensity or strength is calculated for each origin time using the moment tensor components for the image point.

Step 14 Steps 5-13 are repeated for each image point in the volume of interest.

Step 15 Point source locations are selected from the source intensity function.

Interferometric Imaging with Projections Example

The following gives a description of how the interferometric diffraction described in Equations 66 and 67 can be accomplished. The procedure is somewhat similar to that described above, with primary differences being the computations of cross-correlated signals, and the loop over origin time is replaced with a double loop over the sensors and components.

Step 1. The processing system is deployed on a device that can record, transfer and manipulate seismic data (e.g., a computer).

Step 2 Seismic data is recorded at receivers of known position and passed to the processing system. The seismic sensors may consist of one or more vibration sensitive or pressure sensitive components. These vibration sensitive components may be sensitive to vibration in one specific direction. The seismic energy from sources detected by the sensors may or may not be apparent upon initial examination of the data records.

Step 3 The processing system filters and pre-processes the data using standard techniques (such as frequency filtering). If multi-pathed arrivals are to be used, the inverse Hilbert transform (i.e., $H^{-K}\{d_n(r,t)\}$) is computed for each trace.

Step 4 Quantities necessary to determine the data weights in Equation 50 are computed for rays propagating from each receiver position to a set of image points in the volume of interest. Desired quantities could include the complex ray amplitude $A^M(x,r)$, the geometrical spreading factor $R^M(x,r)$, the source direction cosines or angles $\gamma$, receiver direction cosines, $\eta$, and KMAH index for the ray, K. This is done for each propagation phase of interest, M.

Step 5 The recorded data is used to construct a set of cross correlated signals $X'_{km}(r_a;r_b,t)$ where the signal from receiver, $r_a$, component, k, is taken as the reference signal and the signal from $r_b$. Note that not all pairs of cross correlated signals are required. If $r_a=r_b$ then $k \neq m$, as this is the autocorrelation trace and introduces no new information. Also, by symmetry of cross-correlations $X'_{km}(r_a;r_b,t)=X'_{mk}(r_b;r_a,-t)$, so only half the combinations of receiver-receiver cross correlations need to be carried out. Finally it is not necessary to store the entire cross-correlation trace only the time range $\pm \max_x |T(x,r_b)-T(x,r_a)|$ is used. That is the maximum differential moveout between two receivers from a point in the region of interest.

Step 6 Data is selected for an image point and receiver pair according to $X'_{km}(r_a;r_b,t=T_M(x,r_b)-T_M(x,r_a))$. FIG. 13 shows a diagrammatical representation of the data selection.

Step 7 The selected data is projected on to a moment tensor component i,j, by forming the matrix $$\frac{A^M(x,r_a)}{R^M(x,r_a)} \Psi_{ijn}^M(x,r_a) \frac{A^M(x,r_b)}{R^M(x,r_b)} \Psi_{ijn}^M(x,r_b)$$

from the prior determined quantities in the travel time tables (step 4) and computing the vector product with the selected cross-correlation data $X'_{km}(r_a;r_b,t=T_M(x,r_b)-T_M(x,r_a))$. Where a finer spacing of image points is desired than what is allowed for by the table construction in step 4, it is possible to interpolate elements of the table at this stage.

Step 8 The projected data are summed according to the desired weights, $w^M(r_a;r_b,x)$, thus producing a cumulative result for the chosen moment tensor component using the chosen propagation phase at the chosen image point and origin time. The summation can take a variety of forms depending on the chosen weights (including summation, averaging or other descriptive statistics).

Step 9 Steps 7 & 8 are repeated for other moment tensor components.

Step 10 Steps 6-9 are repeated for all reference traces, and for all comparative traces.

Step 11 Steps 6-10 are repeated for additional propagation phases.

Step 12 Steps 6-11 are repeated for each receiver.

Step 13 Steps 6-12 are repeated for other image points in the volume of interest.

Step 14 Point source locations are selected from the source intensity function.

System Example

Figure 18:
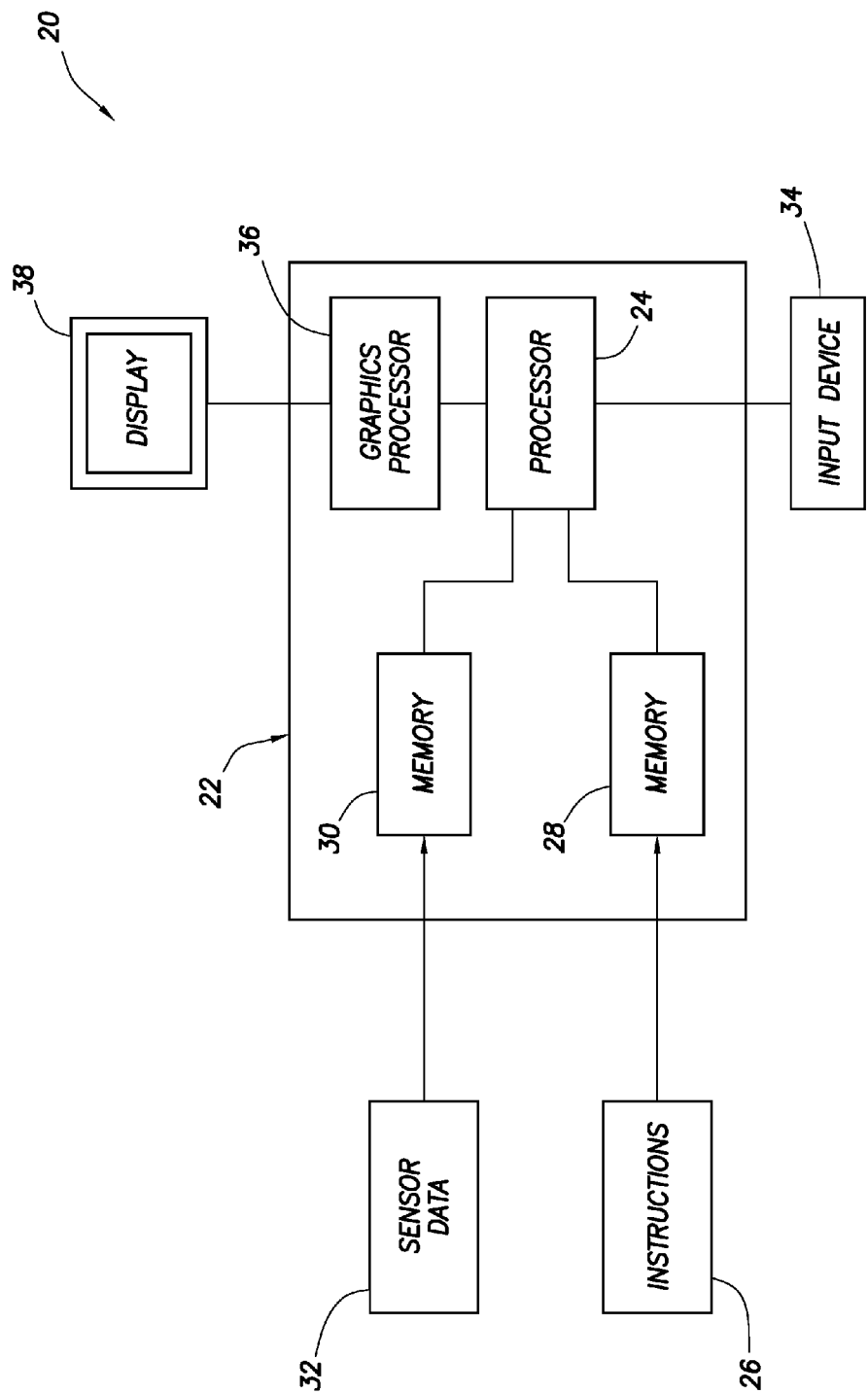
FIG. 18 is a representative diagram of a processing system which may be used to implement a method for imaging a subterranean region of interest, which system and method can embody the principles of this disclosure.

Representatively illustrated in FIG. 18 is an example of a system 20 for imaging a subterranean region of interest. The methods described herein may be implemented using the system 20, or any other methods within the scope of this disclosure may be implemented with the system. However, it is not necessary for the system 20 to be used, in keeping with the principles of this disclosure.

In the FIG. 18 example, the system 20 includes a computer 22 having at least one processor 24. Instructions 26 for performing one or more of the above described methods are loaded into computer memory 28. The instructions 26 could be supplied in any form, but are preferably embodied in a computer readable medium (such as, on a hard drive, solid state memory, or any other type of storage device). Alternatively, the instructions 26 could be transmitted to the computer 22 via any other means (e.g., wired or wireless communication, etc.).

Data 32 from the sensors 10 is also input to computer memory 30. The memory 30 may be the same as, or different from, the memory 28. For example, if the computer 22 is dedicated to performance of the method, then the instructions 26 may be stored in non-volatile ROM-type memory, whereas the sensor data 32 may be stored in RAM-type memory. Any type of memory may be used for either of the memories 28, 30, in keeping with the scope of this disclosure.

The processor 24 carries out the instructions 26, using the input data 32. Additional inputs may be supplied (e.g., by an operator to select options, initiate routines, etc.) via a separate input device 34 (such as, a keyboard, mouse, etc.). Any type of input device 34 may be used, in keeping with the scope of this disclosure.

A separate graphics processor 36 may be used to produce suitable graphics for presentation on a display 38 (such as, a computer monitor, a video screen, a printer, etc.). Any type of display 38 may be used, in keeping with the scope of this disclosure. The graphics processor 36 may also be used to carry out the instructions 26.

From the foregoing description and disclosure of various embodiments, it will be apparent that significant improvements are provided thereby for analyzing the distribution and properties of subsurface events. Various embodiments of the method are described herein solely for the purposes of illustrating the invention in its various aspects.

It is contemplated and to be explicitly understood that various other substitutions, alterations, and/or modifications, including but not limited to any such implementation variants and options as may have been specifically noted or suggested herein, including inclusion of technological enhancements to any particular method step or system component discovered or developed subsequent to the date of this disclosure, may be made to the disclosed embodiments without necessarily departing from the technical and legal scope of this disclosure.

The following variations are specifically contemplated:

1. With respect to event probability/certainty, it is contemplated that it may be advantageous to combine the moment tensor migration imaging procedure disclosed herein with a technique for estimating the probability density function for a stack amplitude to generate a likelihood for position and time being a seismic source.
2. With respect to event location error, it is specifically contemplated that combining the moment tensor migration imaging procedure with probability analysis can be used to estimate an error associated with seismic source location.
3. With respect to a method for full waveform moment tensor inversion, the use of moment tensor migration imaging is contemplated as a first step in an inversion scheme for the moment tensor components.

In examples described above, a method of imaging a subterranean region is provided to the art. The method can comprise: recording actual seismic data output from seismic receivers (e.g., sensors 10) having known positions; inputting the seismic data to a processing system; and the processing system executing instructions which project a selected data sample from the seismic data onto a moment tensor component.

The method can also include the processing system computing desired quantities for determining data weights in the equation:

$$m_{ij}(x, \tau) \cong \alpha \int \sum_{n=1}^{n=3} c_{ij} \sum_{M=1} w^M(r; x, \tau)$$
$$\frac{A^M(x, r)}{R^M(x, r)} \Psi_{ijn}^M(x, r) \times H^{-K}\{d_n(r, t = \tau + T_M(x, r))\} dr$$

where the variables are defined as set forth above.

The desired quantities can include complex ray amplitude $A^M(x,r)$, geometrical spreading factor $R^M(x,r)$, source direction cosines or angles $\gamma$, receiver direction cosines, $\eta$, and ray KMAH index, K, for each propagation phase of interest, M.

The method can also include, for each receiver and component, n, selecting a data sample for a selected image point and origin time as defined by the equation: $(d_n(r,t=\tau+T_M(x,r)))$.

The processing system executing can also include projecting the selected data sample onto the moment tensor component i,j, by forming the vector $$c_{ij} \frac{A^M(x, r)}{R^M(x, r)} \Psi_{ijn}^M(x, r)$$

from prior determined quantities in travel time tables as defined by the equation: $d_n(r,t=\tau+T_M(x,r))$.

The method can also include summing the projected data according to the desired weights, thereby producing a cumulative result for a selected moment tensor component using a selected propagation phase at a selected image point and origin time. The summing may comprise at least one of summation and averaging.

The method can include repeating the summing for any other moment tensor components, thereby producing a cumulative result for all moment tensor components using the selected propagation phase at the selected image point and origin time.

The method can also include repeating the summing for any additional propagation phases, thereby producing a cumulative result for each moment tensor component at the selected image point and origin time.

The method can also include calculating a source intensity using the cumulative result for each moment tensor component at the selected image point and origin time.

The method can also include repeating the summing and calculating steps for each image point and origin time in a volume of interest.

The method can include selecting point source locations from a source intensity function.

Calculating the source intensity can comprise computing the source intensity as the sum of the squares of the cumulative result for each of the moment tensor components. Calculating the source intensity can comprise computing a scalar measure of a combined magnitude of the cumulative result for each of the moment tensor components at each image point.

The plurality of seismic receivers (e.g., sensors 10) consists of one or more vibration sensitive or pressure sensitive components. Each of the plurality of seismic receivers may be sensitive to vibration in only one specific direction.

The method can also include pre-processing the seismic data by frequency filtering.

A system 20 for use in imaging a subterranean region of interest is also described above. In one example, the system 20 can include instructions 26 which operate on recorded actual seismic data 32 output from seismic receivers (e.g., sensors 10) having known positions, and at least one processor 24. The instructions 26 cause the processor 24 to project a selected data sample from the seismic data 32 onto a moment tensor component i,j.

The instructions 26 may cause the processor 24 to compute desired quantities for determining data weights in the equation:

$$m_{ij}(x,\tau) \cong \alpha \int \sum_{n=1}^{n=3} c_{ij} \sum_{M=1} w^M(r;x,\tau) \frac{A^M(x,r)}{R^M(x,r)} \Psi_{ijn}^M(x,r) \times H^{-K}\{d_n(r, t=\tau+T_M(x,r))\} dr$$

where the variables are defined as set forth above.

The instructions 26 may cause the processor 24 to, for each receiver and component, n, select a data sample for a selected image point and origin time as defined by the equation: $(d_n(r, t=\tau+T_M(x,r)))$.

The instructions 26 may cause the processor 24 further to project the selected data sample onto the moment tensor component i,j, by forming the vector $$c_{ij} \frac{A^M(x,r)}{R^M(x,r)} \Psi_{ijn}^M(x,r)$$

from prior determined quantities in travel time tables as defined by the equation: $d_n(r, t=\tau+T_M(x,r))$.

The instructions 26 may cause the processor 24 to sum the projected data according to the desired weights, thereby producing a cumulative result for a selected moment tensor component using a selected propagation phase at a selected image point and origin time.

The projected data may be summed by at least one of summation and averaging.

The instructions 26 may cause the processor 24 to repeat the summing for any other moment tensor components, thereby producing a cumulative result for all moment tensor components using the selected propagation phase at the selected image point and origin time.

The instructions 26 may cause the processor 24 to repeat the summing for any additional propagation phases, thereby producing a cumulative result for each moment tensor component at the selected image point and origin time.

The instructions 26 may cause the processor 24 to calculate a source intensity using the cumulative result for each moment tensor component at the selected image point and origin time.

The instructions 26 may cause the processor 24 to repeat the summing and calculating for each image point and origin time in a volume of interest.

The instructions 26 may cause the processor 24 to select point source locations from a source intensity function.

The instructions 26 may cause the processor 24 to calculate the source intensity as a sum of squares of the cumulative result for each of the moment tensor components.

The instructions 26 may cause the processor 24 to calculate the source intensity as a scalar measure of a combined magnitude of the cumulative result for each of the moment tensor components at each image point.

The instructions 26 may cause the processor 24 to pre-process the seismic data by frequency filtering.

Also described above is a method of imaging a subterranean region. In one example, the method can comprise:
Step 1 recording seismic data at seismic receivers of known position and passing the data to a processing system;
Step 2 filtering and pre-processing the seismic data;
Step 3 computing desired quantities to determine the data weights in an equation:

$$m_{ij}(x,\tau) \cong \alpha \int \sum_{n=1}^{n=3} c_{ij} \sum_{M=1} w^M(r;x,\tau) \frac{A^M(x,r)}{R^M(x,r)} \Psi_{ijn}^M(x,r) \times H^{-K}\{d_n(r, t=\tau+T_M(x,r))\} dr$$

where the variables are defined as set forth herein. The equation preferably retains the speed and flexibility of the diffraction stack approach, but allows for the scope of imaging moment tensor components, and incorporation of multiple propagation modes and data components, from each receiver position to a set of image points in the volume of interest;
Step 4 For each receiver and component, n, selecting a data sample for a given image point and origin time $(d_n(r, t=\tau+T_M(x,r)))$;
Step 5 projecting the selected data onto a moment tensor component i,j, by forming the vector $$c_{ij} \frac{A^M(x,r)}{R^M(x,r)} \Psi_{ijn}^M(x,r)$$

from the prior determined quantities in travel time tables $d_n(r,t=\tau+T_M(x,r))$.

Step 6 summing the projected data according to the desired weights, $w^M(r; x,\tau)$, thereby producing a cumulative result for the chosen moment tensor component using the chosen propagation phase at the chosen image point and origin time;

Step 7 repeating step 6 for other moment tensor components;

Step 8 repeating steps 4 through 7 for additional propagation phases to produce a cumulative result for each moment tensor component at the chosen image point and origin time;

Step 9 calculating a source intensity using the moment tensor components for the image point and origin time of step 8;

Step 10 Repeating steps 4 through 9 for each image point and origin time in the volume of interest; and Step 11 selecting point source locations from the source intensity function.

The plurality of seismic receivers may consist of one or more vibration sensitive or pressure sensitive components. Each of the plurality of seismic receivers may be sensitive to vibration in one specific direction.

The step of filtering and pre-processing the seismic data may include frequency filtering.

The desired quantities may include the complex ray amplitude $A^M(x,r)$, the geometrical spreading factor $R^M(x,r)$, the source direction cosines or angles $\gamma$, receiver direction cosines, $\eta$, and the ray KMAH index, K, for each propagation phase of interest, M.

The summation may comprise summation, averaging or other descriptive statistics, depending on the chosen weights.

The step 9 of calculating a source intensity may include computing the source intensity as the sum of the squares of the moment tensor components.

The step 9 of calculating a source intensity may comprise computing a scalar measure of the combined magnitude of the moment tensor components at an image point.

Another method of imaging a subterranean region described above can include:
(1) recording seismic data at seismic receivers of known positions, and passing the data to a processing system;
(2) computing quantities to determine data weights in a moment tensor imaging migration, the quantities being any measurement derived from tracing of one or more seismic rays;
(3) constructing a set of cross correlated signals where a signal from each receiver component is taken as a reference signal, and cross correlated with a comparative signal from another receiver;
(4) for each receiver and component, selecting a data sample for a given image point and receiver pair;
(5) projecting the selected data sample onto a moment tensor component i,j, by forming a vector from the prior computed quantities in travel time tables and computing a vector product with the selected cross correlated signals;
(6) summing the projected data according to the desired weights, thereby producing a cumulative result for the chosen moment tensor component using the chosen propagation phase at the chosen image point and origin time;
(7) repeating steps (5) and (6) for any other moment tensor components;
(8) repeating steps (4) through (7) for any additional reference signals, and any additional comparative signals;
(9) repeating steps (4) through (8) for any additional propagation phases;
(10) repeating steps (4) through (9) for each additional receiver; and
(11) repeating steps (4) through (10) for each image point and origin time in the volume of interest.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. Accordingly, the foregoing detailed description is to be clearly understood as being given by way of illustration and example only, the spirit and scope of the invention being limited solely by the appended claims and their equivalents.

TABLE OF MATHEMATICAL SYMBOLS

Conventions

Scalars use normal text
Matrices and Vectors use bold

SYMBOLS r Receiver position vector
s Source position vector
x Image point position vector
t Time
$\tau$ Origin time of source
$\omega$ Angular frequency
$d_i(r,t)$ Seismic data recorded on component, i, and receiver position, r and time t.
$f_j(s,\tau)$ Component of point force at position s and time $\tau$.
$G_{ij}(r,s,t)$ Green's function transforming point force component j at s into receiver component i at r.
$G_{ij,k}(r,s,t)$ Spatial derivative of the Green's function with respect to direction k at s.
$m_{jk}(s,\tau)$ Element of moment tensor $\hat{G}_{ij}(r,s,t-\tau)$ Unwrapped Green's function
$H^K(x)$ Hilbert transform of function x.
$H^{-K}(x)$ Inverse Hilbert transform of function x.
$u_i^m$ Part of wavefield corresponding to propagation mode m on component i.
$v_P$ P-wave velocity
$v_S$ S-wave velocity
$\rho$ Density
r Radial distance between source and receiver
$A^M$ Ray amplitude for the ray traveling between the source and receiver, with propagation phase M.
$T^M(r,x)$ Travel times along the ray with propagation phase M.

$$\frac{\partial \Omega}{\partial S}$$

Geometrical spreading in heterogenous media. The ratio of the area of solid angle at the source to the area of wavefront at the receiver.
$\Gamma_{qi}^M$ Matrices projecting the vector of motion at the source onto the components at the receiver for propagation phase M
$\eta_i^{P/S}, \eta_i^{(1)}, \eta_i^{(2)}$ Ray direction at the receiver and two other vectors forming an orthogonal set.
$\gamma_i^{P/S}, \gamma_i^{(1)}, \gamma_i^{(2)}$ Ray direction at source and two other vectors forming an orthogonal set.
$W^o(r)$ Observed wave form attribute
$W^m(r,x)$ Modeled waveform attribute
$I(x,T)$ Image/stack function at image point and origin time
$w(r;x,T)$ Data weight in diffraction stack migration
$X(r_a,r_b;t)$ Cross correlation of traces at sensors $r_a$ and $r_b$ using $r_a$ as the reference.
$w(r_a,r_b,x,t)$ Weight for cross-correlation summation
$\alpha$ Real proportionality constant of imaging approximation
$E_{ij}^m(x,r,\omega)$ Element of the strain tensor observed at x due to point source directed in the $m^{th}$ direction at r. Also referred to as a stress Green's function in text
$F_{ijk}^M$ Operator describing radiation pattern from point source in component, i, for wave type m.
$1/R^M(r,x)$ Geometrical spreading factor $$\left(\frac{\partial \Omega}{\partial S}\right)^{\frac{1}{2}}$$

$\Psi_{ijn}^M(x,r)$ Non-dimensional projection matrix for wave type M observed at receiver, r, and component, n, onto moment tensor components ij.
$\alpha^{-1}(x)$ Imaging balance factor in ray-angles only approximation. Can be thought of as compensation for energy loss due to wave propagation ensuring image points in different positions with the same source magnitude produce the same magnitude of source in the solution.
k Non-zero scalar used in ray-angle approximation
$m_{ij}(x,\Omega;r_a)$ Back projected moment tensor component from a single receiver $r_a$.
$X_{ij}(x,\Omega;r_a,r_b)$ Frequency domain cross-correlation of back projected moment tensor from receiver $r_a$, with that from receiver $r_b$.
$X'_{km}(r_a;r_b,t)$ Time domain cross-correlated signal between receiver $r_a$ component k, and receiver $r_b$ component m.

| Operators | |
|---|---|
| * | Time domain convolution |
| a* | Complex conjugate for scalar, a |
| A* | Conjugate transpose of matrix A |

What is claimed is:

1. A method of imaging a subterranean region, the method comprising:
   recording actual seismic data output from a plurality of seismic receivers of known positions;
   inputting the seismic data to a processing system; and
   the processing system executing instructions which project a data sample from the seismic data onto at least one moment tensor component.

2. The method of claim 1, further comprising the processing system computing a plurality of quantities for determining data weights in a ray based moment tensor imaging migration, the computed quantities being derived from tracing of one or more seismic rays.

3. The method of claim 2, wherein the computed quantities include complex ray amplitude, geometrical spreading factor, source direction cosines or angles, receiver direction cosines, and ray KMAH index, for each propagation mode of interest.

4. The method of claim 2, wherein the data sample corresponds to a specific image point and origin time.

5. The method of claim 4, wherein the processing system executing further comprises projecting the data sample onto the moment tensor component by forming a vector using the computed quantities and travel time tables.

6. The method of claim 2, further comprising summing the projected data according to the determined data weights, thereby producing a cumulative result for the moment tensor component based on a first propagation mode.

7. The method of claim 6, wherein the summing comprises at least one of summation and averaging.

8. The method of claim 6, further comprising repeating the summing for any other moment tensor components, thereby producing a cumulative result for each of the other moment tensor components based on the first propagation mode.

9. The method of claim 8, further comprising repeating the summing for any additional propagation modes, thereby producing a cumulative result for each of the moment tensor components based on the additional propagation modes.

10. The method of claim 9, further comprising calculating a source intensity using the cumulative result for each of the moment tensor components.

11. The method of claim 10, further comprising repeating the summing and the calculating for additional origin times and image points in a volume of interest.

12. The method of claim 11, further comprising selecting point source locations from a source intensity function.

13. The method of claim 10, wherein calculating the source intensity comprises computing the source intensity as a sum of squares of the cumulative results for the moment tensor components.

14. The method of claim 10, wherein calculating the source intensity comprises computing a scalar measure of a combined magnitude of the cumulative results for the moment tensor components at each image point.

15. The method of claim 1, wherein the plurality of seismic receivers consists of one or more vibration sensitive or pressure sensitive components.

16. The method of claim 1, wherein each of the plurality of seismic receivers is sensitive to vibration in only one specific direction.

17. The method of claim 1, further comprising pre-processing the seismic data by frequency filtering.

18. A system for use in imaging a subterranean region of interest, the system comprising:
- instructions which operate on recorded actual seismic data output from a plurality of seismic receivers having known positions; and
- at least one processor, whereby the instructions cause the processor to project a data sample from the seismic data onto at least one moment tensor component.

19. The system of claim 18, wherein the instructions cause the processor to compute a plurality of quantities for determining data weights in a ray based moment tensor imaging migration, the computed quantities being derived from tracing one or more seismic rays.

20. The system of claim 19, wherein the computed quantities include complex ray amplitude, geometrical spreading factor, source direction cosines or angles, receiver direction cosines, and ray KMAH index, for each propagation mode of interest.

21. The system of claim 19, wherein the data sample corresponds to a selected image point and origin time.

22. The system of claim 21, wherein the instructions cause the processor to project the data sample onto the moment tensor component by forming a vector using the computed quantities and travel time tables.

23. The system of claim 19, wherein the instructions cause the processor to sum the projected data according to the determined data weights, thereby producing a cumulative result for the moment tensor component based on a first propagation mode.

24. The system of claim 23, wherein the projected data is summed by at least one of summation and averaging.

25. The system of claim 23, wherein the instructions cause the processor to repeat the summing for any other moment tensor components, thereby producing a cumulative result for each of the other moment tensor components based on the first propagation mode.

26. The system of claim 25, wherein the instructions cause the processor to repeat the summing for any additional propagation modes, thereby producing a cumulative result for each of the moment tensor components based on each additional propagation mode.

27. The system of claim 26, wherein the instructions cause the processor to calculate a source intensity using the cumulative result for each of the moment tensor components.

28. The system of claim 27, wherein the instructions cause the processor to repeat the summing and the calculating for additional origin times and image points in a volume of interest.

29. The system of claim 28, wherein the instructions cause the processor to select point source locations from a source intensity function.

30. The system of claim 27, wherein the instructions cause the processor to calculate the source intensity as a sum of squares of the cumulative results for the moment tensor components.

31. The system of claim 27, wherein the instructions cause the processor to calculate the source intensity as a scalar measure of a combined magnitude of the cumulative results for the moment tensor components at each image point.

32. The system of claim 18, wherein the plurality of seismic receivers consists of one or more vibration sensitive or pressure sensitive components.

33. The system of claim 18, wherein each of the plurality of seismic receivers is sensitive to vibration in only one specific direction.

34. The system of claim 18, wherein the instructions cause the processor to pre-process the seismic data by frequency filtering.

35. A method of imaging a subterranean region, the method comprising:
(1) recording seismic data at a plurality of seismic receivers of known positions, and passing the data to a processing system;
(2) filtering and pre-processing the seismic data;
(3) computing a plurality of quantities to determine data weights in a ray based moment tensor imaging migration, the quantities being derived from tracing of one or more seismic rays;
(4) obtaining a data sample corresponding to a selected image point and origin time;
(5) projecting the data sample onto a moment tensor component by forming a vector using the computed quantities and travel time tables;
(6) summing the projected data according to the determined data weights, thereby producing a cumulative result for the moment tensor component based on a first propagation mode;
(7) repeating (6) for any other moment tensor components;
(8) repeating (4) through (7) for any additional propagation modes to produce a cumulative result for each of the moment tensor components based on the additional propagation modes;
(9) calculating a source intensity using the cumulative results for the moment tensor components;
(10) repeating (4) through (9) for additional origin times and image points in a volume of interest; and
(11) selecting point source locations from a source intensity function.

36. The method of claim 35, wherein the plurality of seismic receivers consists of one or more vibration sensitive or pressure sensitive components.

37. The method of claim 35, wherein each of the plurality of seismic receivers are sensitive to vibration in one specific direction.

38. The method of claim 35, wherein the step of filtering and pre-processing the seismic data includes frequency filtering.

39. The method of claim 35, wherein the computed quantities include a complex ray amplitude, a geometrical spreading factor, source direction cosines or angles, receiver direction cosines, and a ray KMAH index, for each propagation mode of interest.

40. The method of claim 39, wherein the summation comprises at least one of summation and averaging.

41. The method of claim 40, wherein the of calculating a source intensity comprises computing a sum of squares of the cumulative results for the moment tensor components.

42. The method of claim 40, wherein the calculating a source intensity comprises computing a scalar measure of a combined magnitude of the cumulative results for the moment tensor components at each image point.

43. A method of imaging a subterranean region, the method comprising:
(1) recording seismic data at a plurality of seismic receivers of known positions, and passing the data to a processing system;
(2) computing a plurality of quantities to determine data weights in a moment tensor imaging migration, the computed quantities being derived from tracing of one or more seismic rays;
(3) constructing a set of cross correlated signals, where a signal from each seismic receiver is taken as a reference signal, and cross correlated with a comparative signal from another seismic receiver;
(4) for each seismic receiver pair, obtaining a data sample for a selected image point and origin time;
(5) projecting the data sample onto a moment tensor component by forming a vector using the computed quantities and travel time tables, and computing a vector product with the cross correlated signals;
(6) summing the projected data according to the determined data weights, thereby producing a cumulative result for the moment tensor component based on a first propagation mode;
(7) repeating (5) and (6) for any other moment tensor components;
(8) repeating (4) through (7) for any additional reference signals, and any additional comparative signals;
(9) repeating (4) through (8) for any additional propagation modes;
(10) repeating (4) through (9) for each additional receiver; and
(11) repeating (4) through (10) for each additional origin time and image point in a volume of interest.

44. The method of claim 43, wherein the plurality of seismic receivers consists of one or more vibration sensitive or pressure sensitive components.

45. The method of claim 43, wherein each of the plurality of seismic receivers is sensitive to vibration in one specific direction.

46. The method of claim 43, further comprising filtering and pre-processing the seismic data.

47. The method of claim 46, wherein the filtering and pre-processing the seismic data includes frequency filtering.

48. The method of claim 43, wherein the computed quantities include a complex ray amplitude, a geometrical spreading factor, source direction cosines or angles, receiver direction cosines, and a ray KMAH index, for each propagation mode of interest.

49. The method of claim 43, further comprising:
(12) calculating a source intensity using the cumulative results for the moment tensor components for the origin times and image points in the volume of interest; and
(13) selecting point source locations from a source intensity function.

* * * * *